United States Patent
Holmes

(10) Patent No.: US 8,673,259 B2
(45) Date of Patent: Mar. 18, 2014

(54) APPARATUS AND METHOD FOR SUBSTRATE AND GAS HEATING DURING CHEMICAL VAPOR DEPOSITION NANOTUBE SYNTHESIS

(75) Inventor: William A. Holmes, Irving, TX (US)

(73) Assignee: Solarno Inc., Coppell, TX (US)

( * ) Notice: Subject to any disclaimer, the term of this patent is extended or adjusted under 35 U.S.C. 154(b) by 5 days.

(21) Appl. No.: 13/105,698

(22) Filed: May 11, 2011

(65) Prior Publication Data

US 2011/0280794 A1    Nov. 17, 2011

Related U.S. Application Data

(60) Provisional application No. 61/333,327, filed on May 11, 2010.

(51) Int. Cl.
*D01F 9/127* (2006.01)
*B82Y 40/00* (2011.01)

(52) U.S. Cl.
USPC .......... 423/447.8; 423/447.3; 204/157.15; 204/157.4; 204/157.47; 977/843

(58) Field of Classification Search
USPC ........ 423/447.1–447.3, 445 B; 977/742–754, 977/842–848; 428/367
See application file for complete search history.

(56) References Cited

U.S. PATENT DOCUMENTS

| | | | |
|---|---|---|---|
| 2005/0053542 A1* | 3/2005 | Harutyunyan | 423/447.3 |
| 2007/0144887 A1* | 6/2007 | Chang et al. | 204/173 |
| 2008/0170982 A1* | 7/2008 | Zhang et al. | 423/447.3 |

FOREIGN PATENT DOCUMENTS

EP    1061041    * 12/2000    ............. C01B 31/02

OTHER PUBLICATIONS

Nessim, et al., Low Temperature Synthesis of Vertically Aligned Carbon Nanotubes with Electrical Contact to Metallic Substrates Enabled by Thermal Decomposition of the Carbon Feedstock, Nano Letters 2009; 9(10): 3398-3405 (published online Aug. 31, 2009).*
Nessim, et al., Low Temperature Synthesis of Vertically Aligned Carbon Nanotubes with Electrical Contact to Metallic Substrates Enabled by Thermally Decomposition of the Carbon Feedstock, Nano Letters 2009; 9(10): 3398-3405.*

* cited by examiner

*Primary Examiner* — Daniel C McCracken

(57) ABSTRACT

Apparatus and methods are described for separate heating of substrate, catalyst and feedstock/transport gases for the controllable CVD synthesis of various carbon nanotubes and nanostructures, and particularly for CVD growth of oriented forests of multi-wall CNT forests, which are highly dry-spinnable into sheets and yarns.

4 Claims, 20 Drawing Sheets

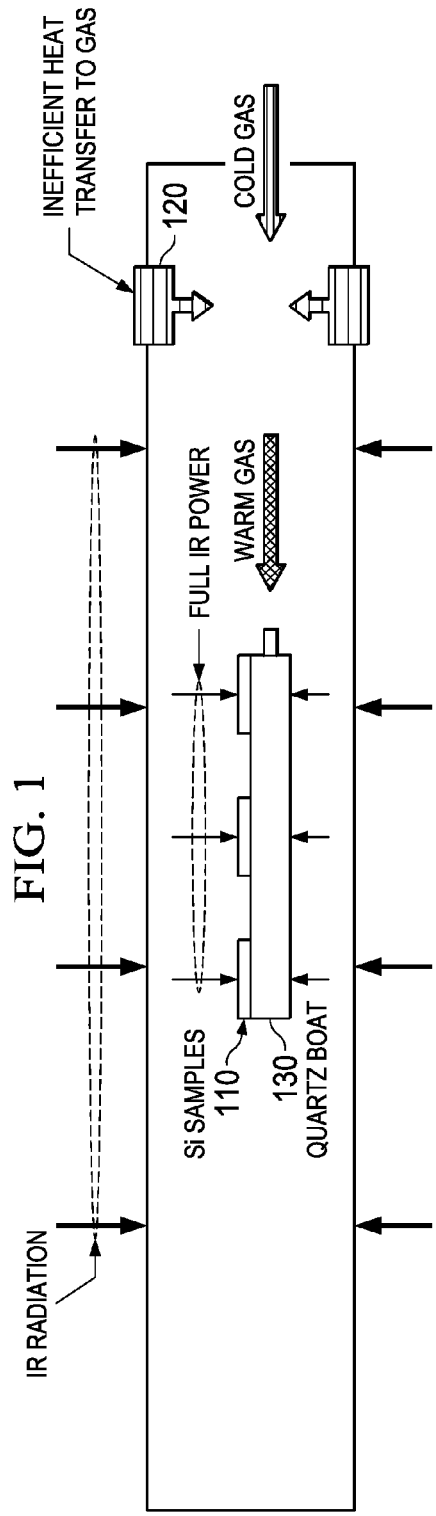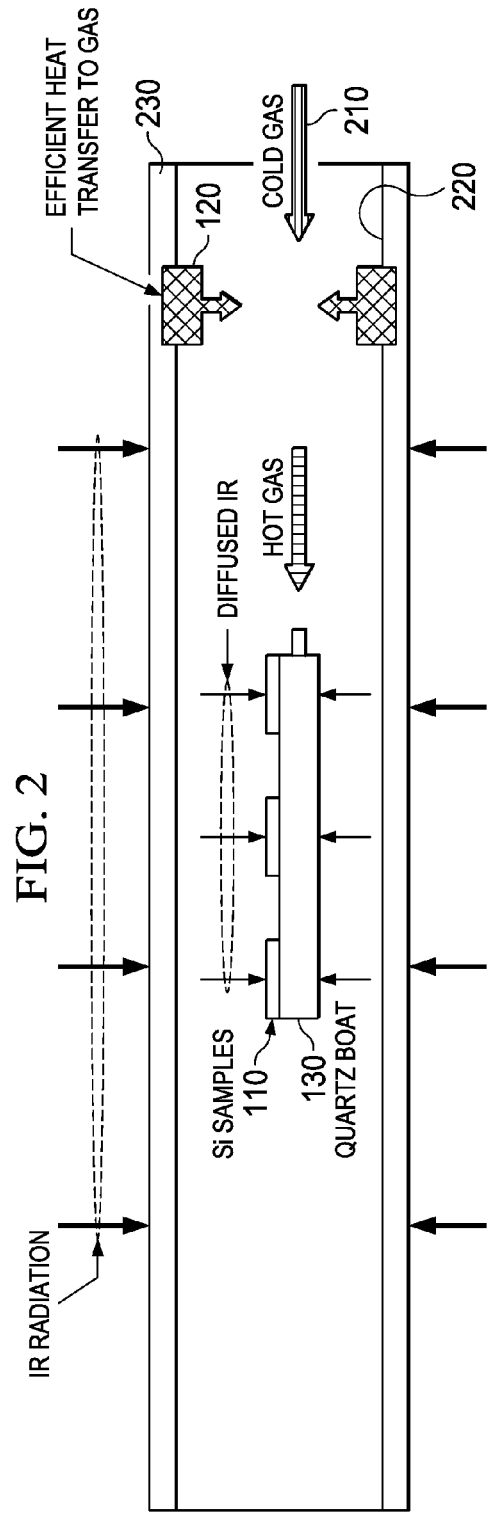

1510

1610

1620

APPARATUS AND METHOD FOR SUBSTRATE AND GAS HEATING DURING CHEMICAL VAPOR DEPOSITION NANOTUBE SYNTHESIS

CROSS-REFERENCE TO RELATED APPLICATION

This application claims the benefit of U.S. Provisional Application Ser. No. 61/333,327, filed by Holmes on May 11, 2010, entitled "Apparatus and method for Substrate and Gas Heating During CVD Nanotube Synthesis," commonly assigned with this application and incorporated herein by reference.

TECHNICAL FIELD

This application is directed, in general, to a nanostructure synthesis and, more specifically, to a method and apparatus for substrate and gas heating during chemical vapor deposition (CVD) nanotube synthesis.

BACKGROUND

Carbon nanotubes can be produced in a CVD furnace to create parallel arrays of nanotubes called "forests." The material is grown from various catalysts deposited on substrates in an e-beam evaporation system. The substrates are placed into a furnace and heated at a typical range of 600° C. to 900° C. A hydrocarbon is then flowed over the substrates providing the carbon feedstock to grow nanotubes. An inert gas such as argon or helium is used as a carrier gas to transport the hydrocarbon to the substrates. Additional gasses such as hydrogen can be added to the system to improve nanotubes growth and properties.

Growth of the nanotube forests occurs in a typical quartz tube furnace of varying diameters from one to four inches or larger. The nanotube substrates are inserted into the furnace, and the system is sealed for gas flow. Electrical elements along the length of the tube heat up the system to a desired growth temperature. Once the system is at the desired temperature the hydrocarbon is introduced into the furnace. The hydrocarbon then heats up and dissociates on the catalyst particle, which in turn grows carbon nanotube forests. After growth of typically 10-30 minutes the system is allowed to cool, and the samples are collected.

SUMMARY

One aspect provides a method for advanced separate heating of reaction and product components during CVD synthesis of carbon based nanostructures. In one embodiment, the method includes: (1) introducing feedstock and at least one transport gas into a first chamber of a CVD system, (2) employing a gas heat exchanger to heat the feedstock and the at least one transport gas, (3) placing a substrate on a substrate holder in a second chamber of the CVD system, (4) employing an induction heater to heat the substrate holder and the substrate and (5) employing the at least one transport gas to convey atoms from the feedstock to the substrate.

BRIEF DESCRIPTION

Reference is now made to the following descriptions taken in conjunction with the accompanying drawings, in which:

FIG. 1 is the schematic of one embodiment of a clean quartz tube and associated heating effects;

FIG. 2 is the schematic of one embodiment of a carbon coated quartz tube;

DETAILED DESCRIPTION

Disclosed herein are various apparatus and methods by which carbon nanostructures, such as carbon nanotubes (CNT), CNT forests and other carbon nanoforms, such as graphene (GR), can be grown by CVD. In various embodiments of the apparatus and methods, the resulting carbon nanostructures are superior to those grown by conventional techniques in terms of one or more of uniformity, density, length, structural perfection and height throughout the production area. In many embodiments, the resulting macroscopic carbon nanostructures, such as carbon nanotube forests, can be drawn into sheets and yarns. These CVD growth factors are particularly important for CNT nanotube oriented forests that can be drawn into transparent sheets or spun into twisted yarns. Without these properties, which are created during CVD growth, the forests are difficult, if not impossible, to draw. Typical nanotube growth yields varying forest properties depending on run conditions within the CVD growth chamber. Conventional CVD growth apparatus and methods employ a single furnace to heat all components of production: feedstock gas, substrate, catalyst at the same time and in the same place in the chamber. In contrast, various embodiments of the apparatus and methods disclosed herein employ separate heating zones to pre-heat the feedstock and transport gases, a substrate, and catalyst independently for fine control in both time and space.

In certain embodiments, separate heating of the gas, substrate, and catalyst is achieved by employing various heating techniques within a single CVD system, which integrates separate processes in different sub-chambers using improved processing. This includes resistive heating tube furnaces and induction heating coils for radio frequency (RF) and/or microwave (MW) radiative energy induction. In some embodiments, induction RF or MW heating provides a relatively fast way to heat nanotube substrates to production temperature for advanced CVD processes.

Conventional CVD systems use only one furnace to heat the substrate and gasses within the same system. This gives the user only one option when it comes to the growth temperature and no control over the individual components. By separately heating the incoming gasses and substrate, a measure of control is gained. For example, a higher gas temperature may be attained without affecting the substrate growth temperature. Described herein are various ways heating of individual components may be carried out and, further, how increased temperatures of incoming reactant gasses may improve nanotube growth and yield advantageous sheet properties.

Figure 10:
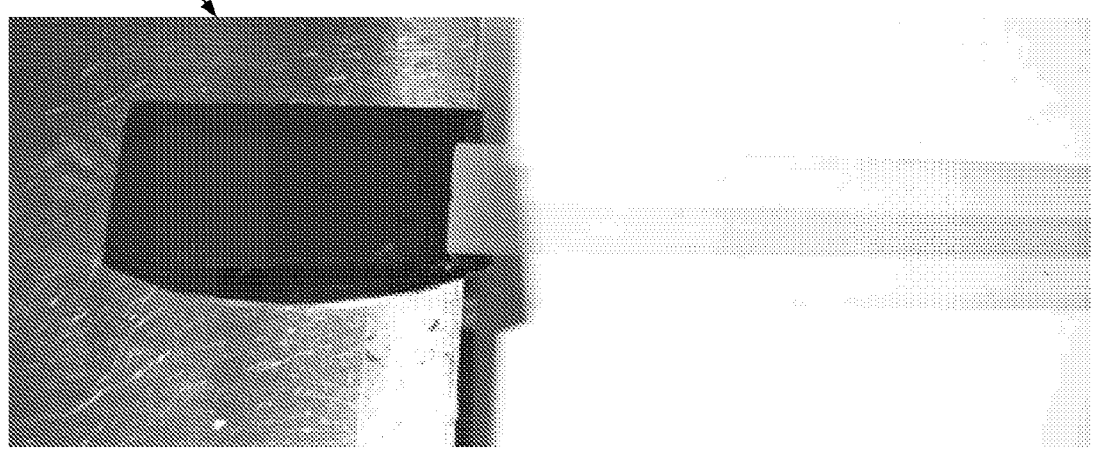
FIG. 10 is a photograph of one embodiment of a nanotube sheet.
Figure 18A:
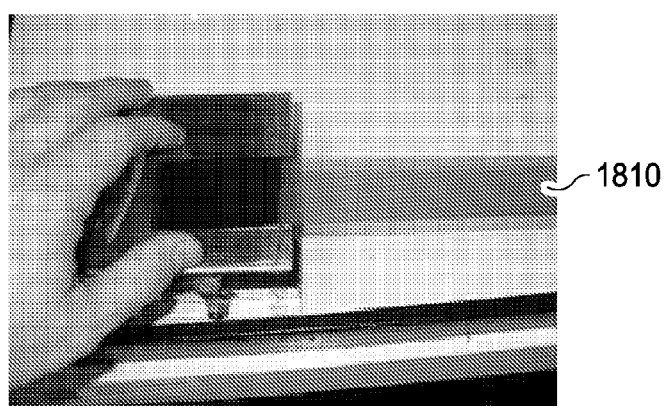
FIGS. 18A and 18B show one embodiment of a method of drawing and spinning sheets from a nanotube forest.
Figure 18B:
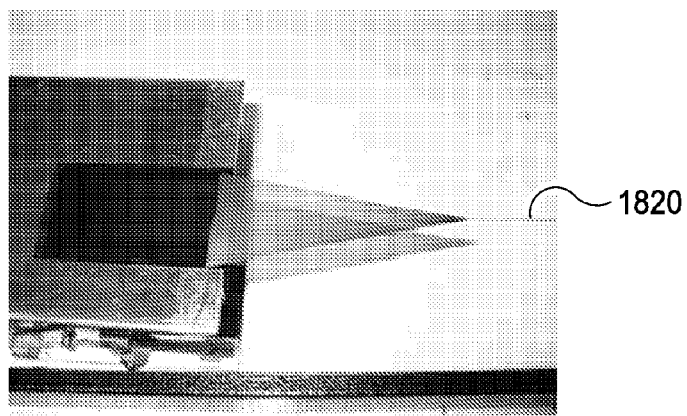

Carbon nanotubes hold great promise for a wide variety of applications, and multi-walled carbon nanotubes are particularly advantageously transformed into highly conductive, transparent, and strong sheets 1810 as FIG. 18A shows from spun nanotubes 1820 as FIG. 18B shows. Nanotube forests are grown in a CVD process, and transparent sheets 1010 may be drawn from the substrates as seen in FIG. 10. Forests grown on silicon substrates can be pulled off by mechanically gripping the edge of the forest. As the leading edge is pulled away from the forest the nanotubes stick together and begin to weave like wool. Pulling induces alignment in the tubes that enhance their electrical and optical properties. These sheets may then be used in many applications, such as electrodes for solar cells. The pulled sheet is much longer than the substrate, about 10 m of sheet for only 1 cm of sample.

Nanotube growth in a conventional quartz tube presents multiple problems. First, the incoming gasses are inefficiently heated by the quartz due to its relatively low thermal conductivity of about 1.3 W/(m·K). The primary means of heating the gas is with IR radiation, which does not heat gasses efficiently. When the gasses contact the first substrates they are not hot enough to efficiently catalyze carbon nanotubes. Once the gasses reach the samples downstream though, the additional heating provided by the samples and quartz boat heat the gasses enough to effectively catalyze nanotube formation. This makes the samples downstream more uniform and dense.

In addition to insufficient gas heating, uneven IR radiation from the tube furnace elements adversely affects the nanotube substrates. The uneven IR radiation on the substrates adversely affects the formation of catalyst clusters, enhancing Ostwald ripening, which is undesirable for nanotube growth. Ostwald ripening occurs when larger catalyst particles take atoms from smaller particles, eventually depleting the smaller particles and enhancing the large particles, which is undesirable. The IR radiation creates "hot spots," which irregularly destroys catalyst material. Catalyst clusters become larger and form irregularities that directly affect the forest quality. When the IR radiation is diffused properly, the hot spots are eliminated and the clusters form into homogeneous arrays, and Ostwald ripening is significantly reduced.

The inner coating of carbon actually has a positive effect on the formation of nanotubes. The carbon coating has a thermal conductivity of 150 W/(m·K), which is over 100 times that of quartz. This coating effectively transfers the heat to the gasses so they more efficiently catalyze nanotubes. The carbon acts as a black body source, absorbing the IR and converting it to thermal conductive energy into the gasses.

The carbon coating also disperses the incoming IR before it strikes the substrates. This dispersed energy does not adversely affect catalyst formation as the concentrated energy did in the clean tube embodiment above. This allows the catalyst particles to form homogeneously on the substrate and minimizes Ostwald ripening so the particles are smaller. These small homogeneous catalyst particles create improved nanotube forests that are relatively dense and uniform.

In summary, a tube with an internal carbon coating resulting from previous runs improves nanotube growth by 1) efficiently heating the incoming gas to the proper reaction temperature and 2) prevents catalyst degradation and Ostwald ripening by diffusing IR radiation from the substrates. Therefore, various embodiments described herein provide methods and apparatus to achieve: (1) efficient heating of incoming gasses prior to their arrival at the substrate(s), and (2) prevention of catalyst degradation and Ostwald ripening which can occur due to uneven and premature heating of the substrates.

Figure 16A:
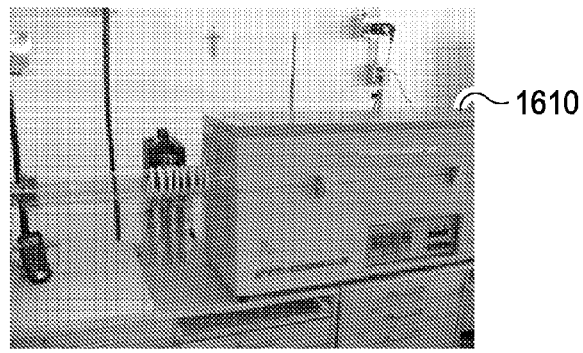
FIGS. 16A and 16B show photographs of one embodiment of an induction system.
Figure 16B:
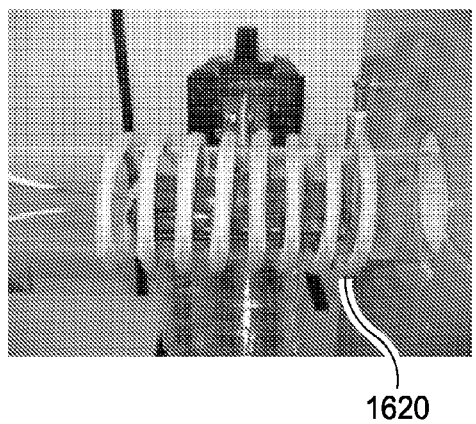
Figure 17:
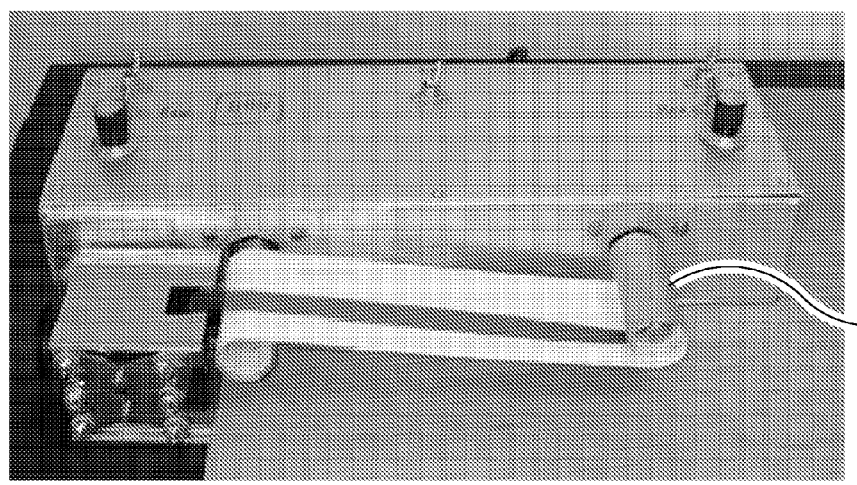
FIG. 17 shows one embodiment of a reel-to-reel collection system for nanotube sheets.

To achieve relatively fast heating of the substrates, a novel system has been developed to grow carbon nanotubes using a fast induction heating system 1610 as seen in FIGS. 16A and 16B. Instead of heating the substrate in 20 minutes using a slow resistive heated furnace the samples are heated in only two minutes using an induction coil system 1620. This improves nanotube growth and makes forests that are highly spinnable, conductive, and transparent. The spinnable forests have the ability to be dry drawn continuously so they can be used in large manufacturing processes were a constant supply of material is needed. They can be continuously rolled onto films and products 1710 as seen in FIG. 17.

Conventional CVD system have one or more of the following disadvantages: (1) they are slow to heat up and cool down; (2) they are difficult to view or study in-situ growth; (3) their furnaces need to cool between runs; and (4) they cannot control gas and substrate temperature independently. In contrast, various embodiments of the induction-based CVD system described herein have the following advantages: (1) they heat up and cool down faster; (2) one can visibly see growth, allowing for in-situ monitoring; (3) the pre-heat furnace can be left on between sample runs, so there is no need to cool down between runs; and (4) gas and substrate temperatures can be independently controlled.

Fast sample heating minimizes Ostwald ripening. As stated above, Ostwald ripening occurs when particles take atoms from neighboring particles eventually forming larger particles that hinder good nanotube growth. This puts a "time limit" on good nanotube forest growth. One embodiment of the induction system takes only two to three minutes to heat to 700° C., while a conventional system takes at least 20 minutes. This minimizes ripening and makes uniform, highly spinnable forests.

The induction system creates forests that are highly spinnable with an A+ on the grading system. The spinnability of nanotube forests is given a grading system to assess the quality of the spun sheets:

Grade A+: Highly spinnable forest that spins the full width of the sample. The sheet widens as it is pulled from the forest.

Grade A: Highly spinnable forest that spins the full width of the sample. The sheet does not widen as it is pulled.

Grade B: Spinnable forest that can pull good sheets, but the sheets are not the full width of the sample.

Grade C: Spinnability starts but is quickly narrows and breaks after a few centimeters.

Grade D: Spinnability does not start but fibers can be seen on the forest wall.

Grade F: Spinnability does not start and the forest wall is smooth.

Figure 19A:
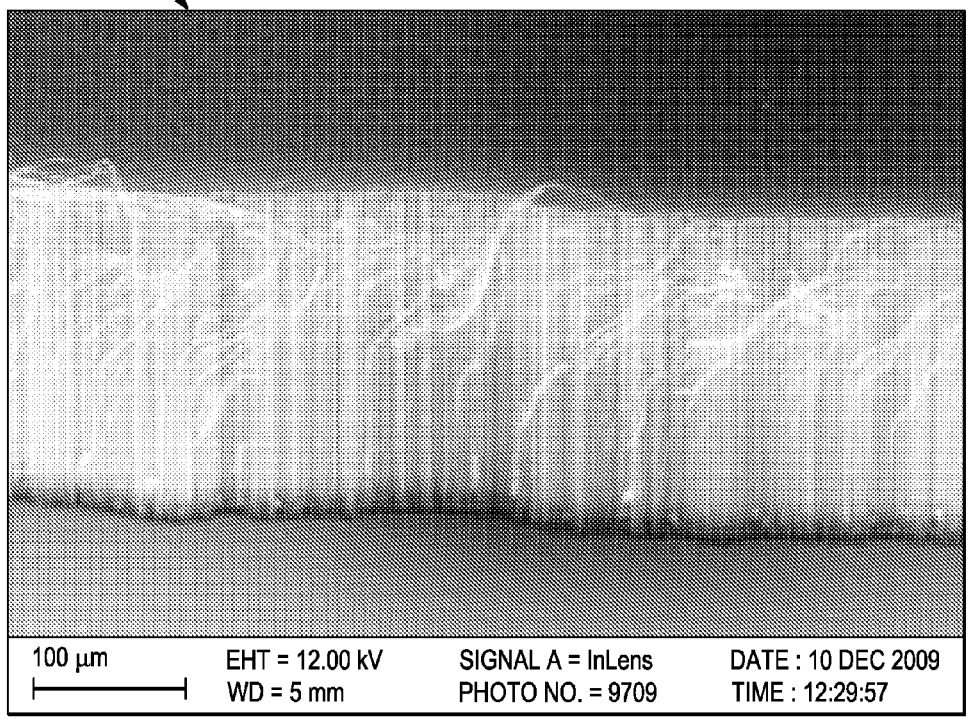
FIGS. 19A and 19B show photographs of a high quality, spinnable dense forest versus a low quality un-spinnable forest.
Figure 19B:
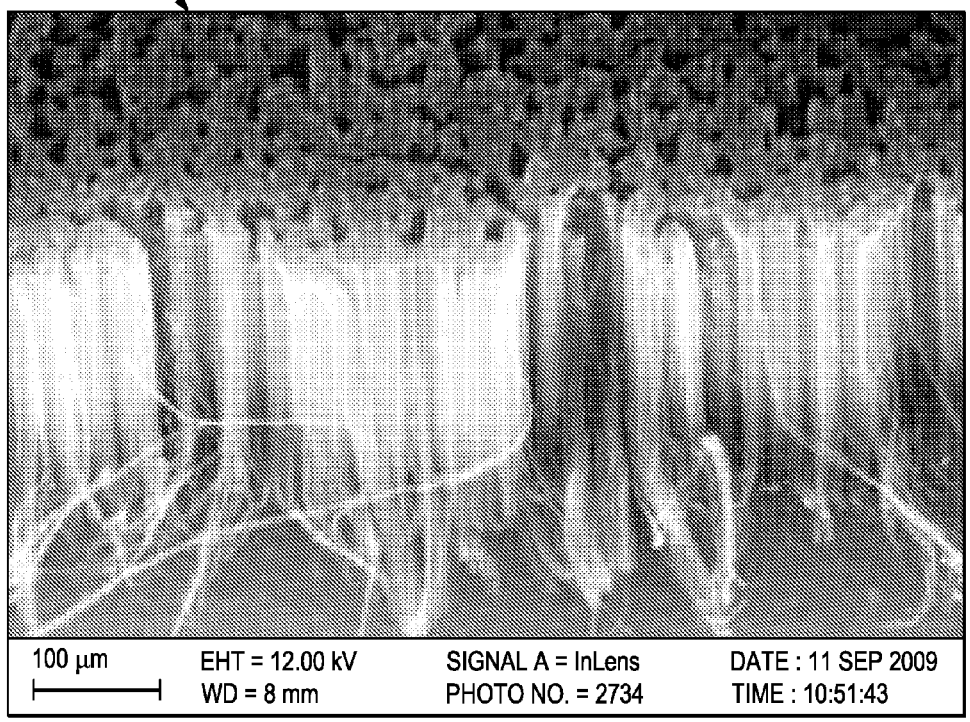
Figure 20A:
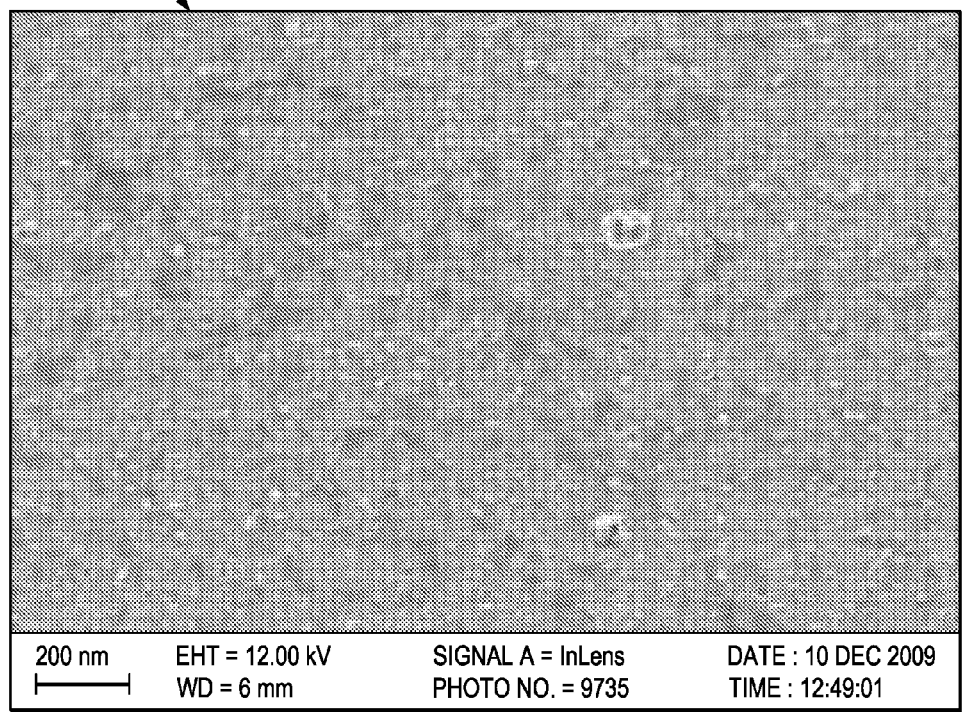
FIGS. 20A and 20B show silicon surfaces after removing nanotube forest exhibiting a high catalyst density and a low catalyst density.
Figure 20B:
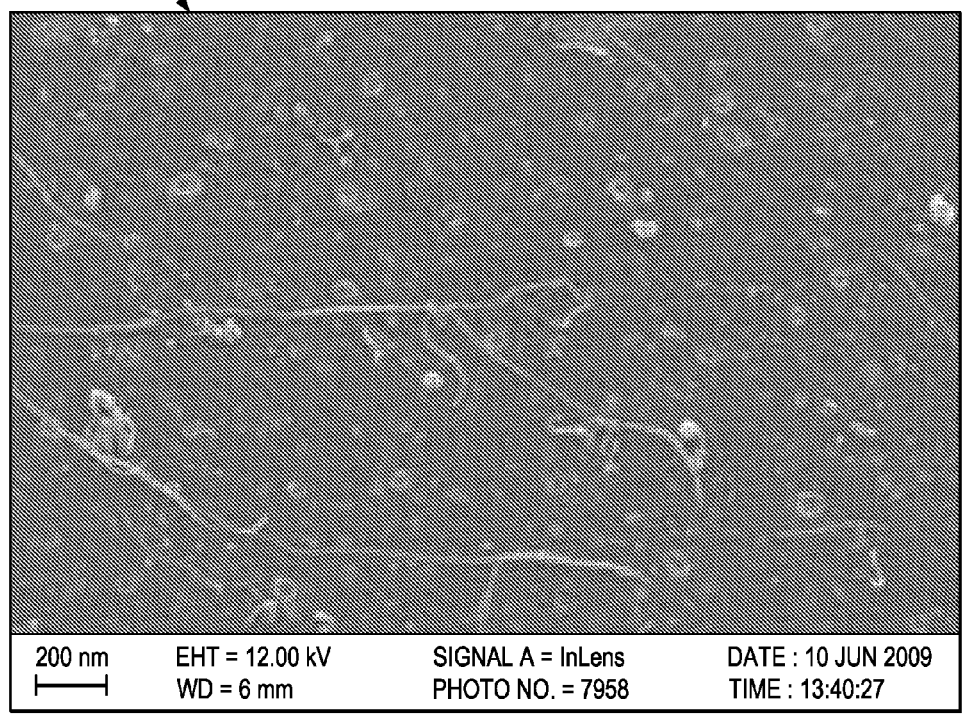

Highly spinnable forests are dependent on many factors such as interconnects between tubes, height of the forest, forest density and forest quality. FIGS. 19A and 19B show the comparison between a highly spinnable, high-quality, dense forest 1910 and a low quality, substantially un-spinnable forest 1920. The irregular top side of the forest 1920 shows variances in density that leads to a poorly spinnable forest. In contrast the good forest 1910 is smooth and shows excellent spinnability. The pre-heating and induction systems improve those qualities that make a good forest. This can be further seen by an SEM of catalyst surface 2010, 2020 after removal of the forests 1910, 1920 as seen in FIGS. 20A and 20B. The catalyst clusters are dense in the spinnable sample and sparse in the non-spinnable sample.

Figure 21A:
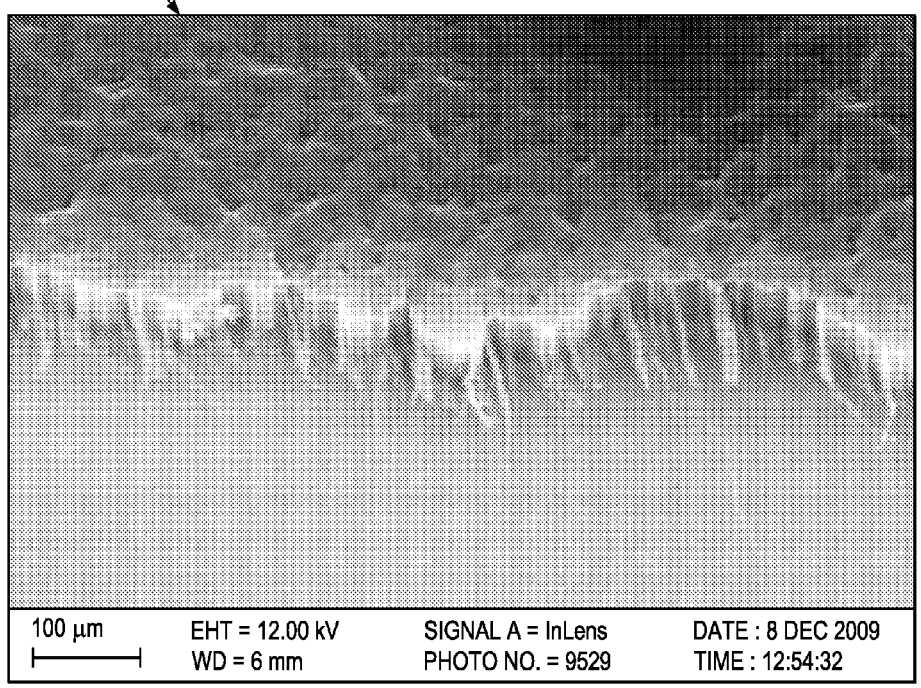
FIGS. 21A and 21B show SEM images of short and tall forests.
Figure 21B:
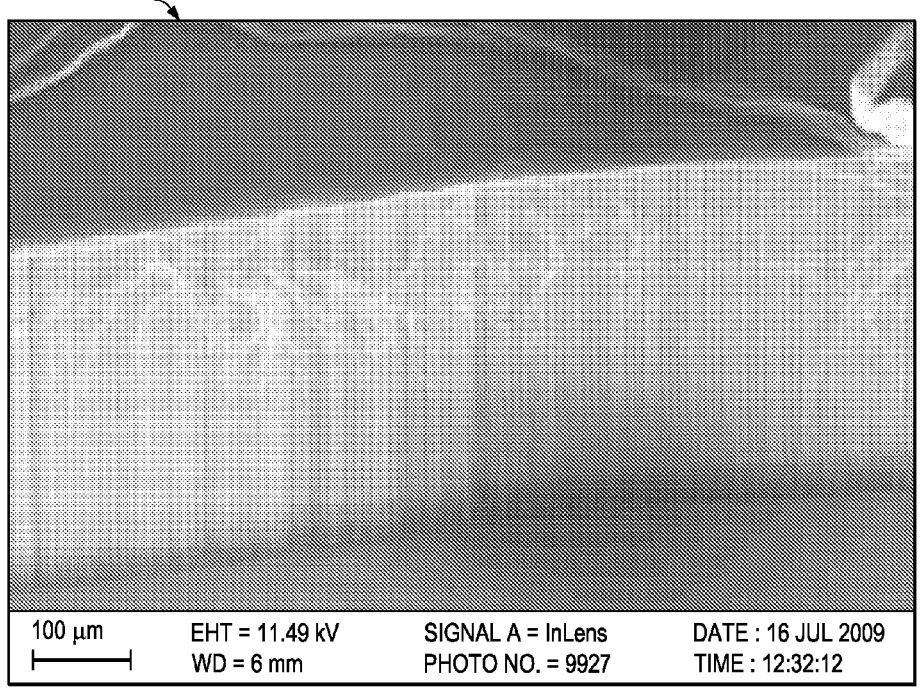
Figure 22:
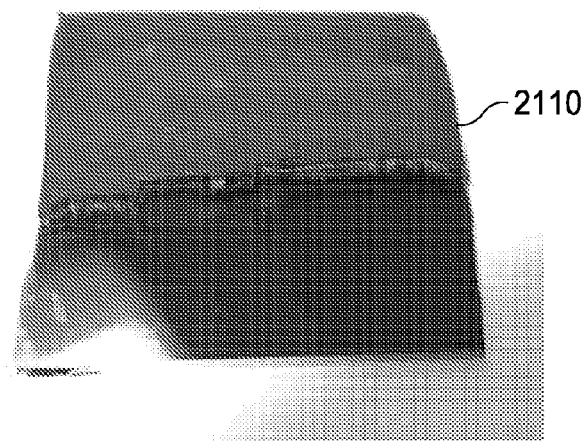
FIG. 22 shows a photograph of a 1.2 mm tall forest.

The improved heating of the samples also leads to tall forests. FIGS. 21A and 21B are an SEM comparison of short and tall forests 2110, 2120. The short forest 2110 was made without the pre-heat/induction system, while the tall forest 2120 was made in accordance with the teachings herein. The improved heating keeps the catalyst active longer and increases the growth rate of nanotube formation. FIG. 22 shows a 1.2 mm tall forest 2210 grown with these settings. Absent the novel system described herein, the highest forest that could be grown was only 0.5 mm.

Figure 23:
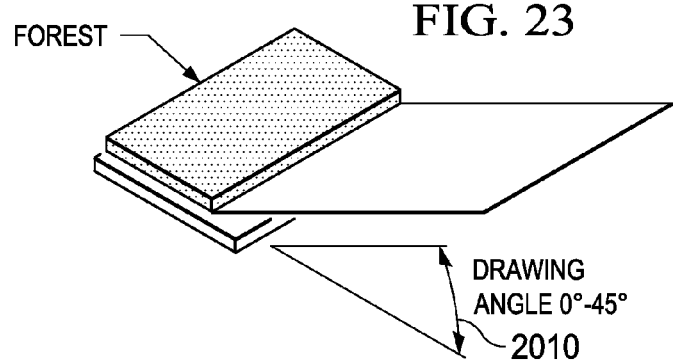
FIG. 23 shows drawing angles for nanotube sheet pulling.

When spinning nanotube sheets with conventional systems, the sheet typically needs to be drawn at a relatively small angle (e.g., 0°) with respect to the substrate surface. Increasing this angle over about 10° causes the nanotube sheet to break, and spinning stops. Forests created as taught herein are so much more spinnable, they can sustain spinning up to 45° (as a drawing angle 2310 indicates) before the sheet breaks. FIG. 23 illustrates this fact.

Figure 8A:
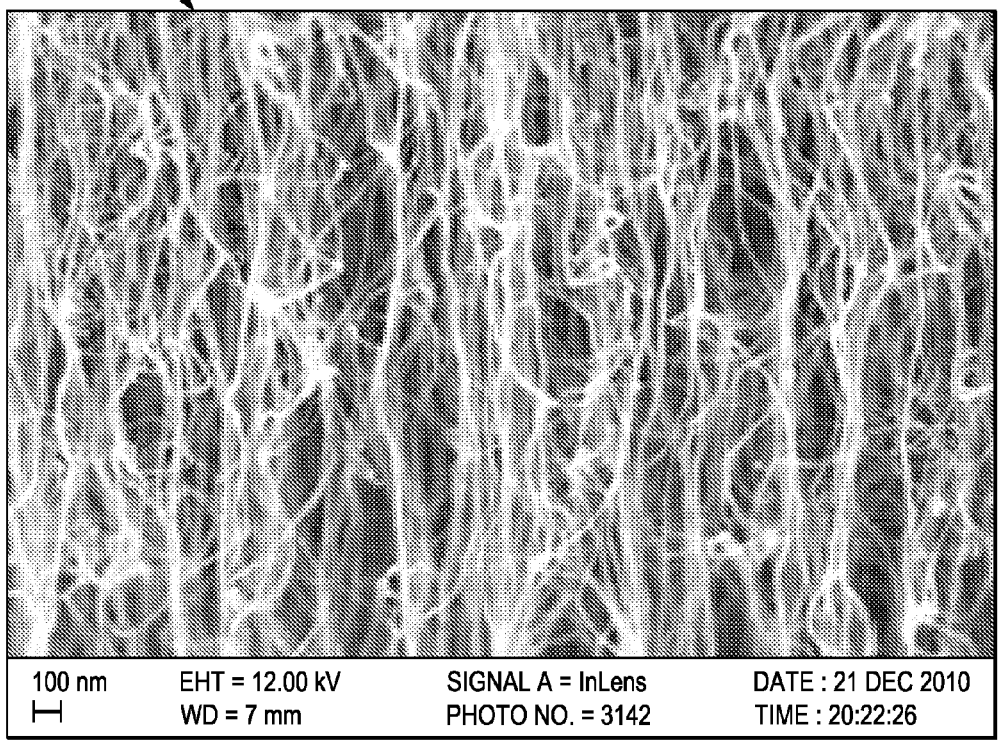
FIGS. 8A and 8B are SEM images comparing induction and conventional CVD tubes.
Figure 8B:
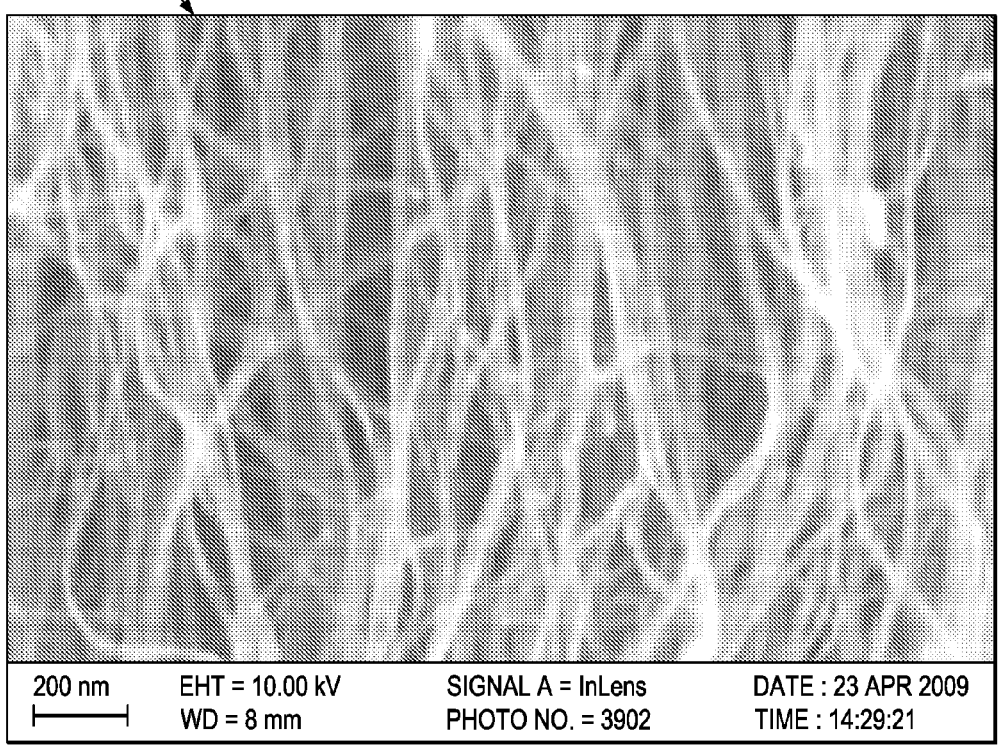

Characterization of the induction grown nanotube sheets show increased nanotube density and uniformity. The SEM of induction tubes show dense forests with many interconnects. The conventional forests grown in a conventional CVD system exhibit a substantially lower density and fewer interconnects, as FIGS. 8A and 8B show.

Figure 9A:
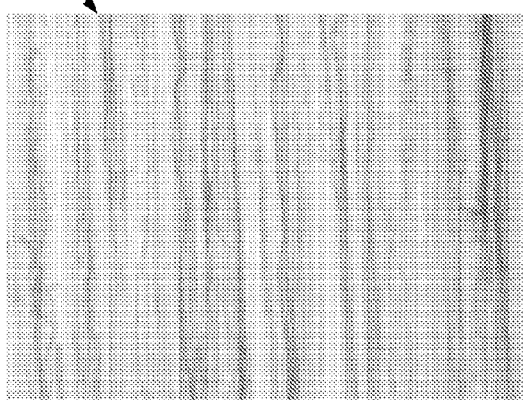
FIGS. 9A and 9B are SEM images comparing induction versus conventional CVD sheets.
Figure 9B:
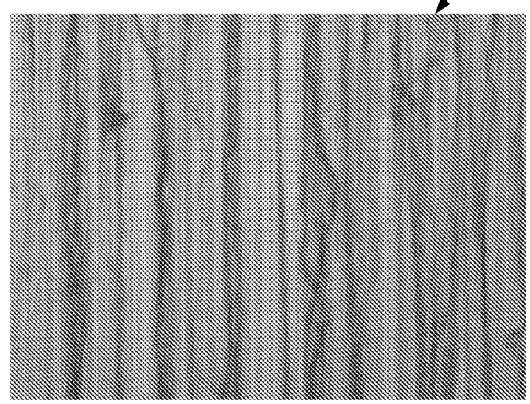
Figure 9C:
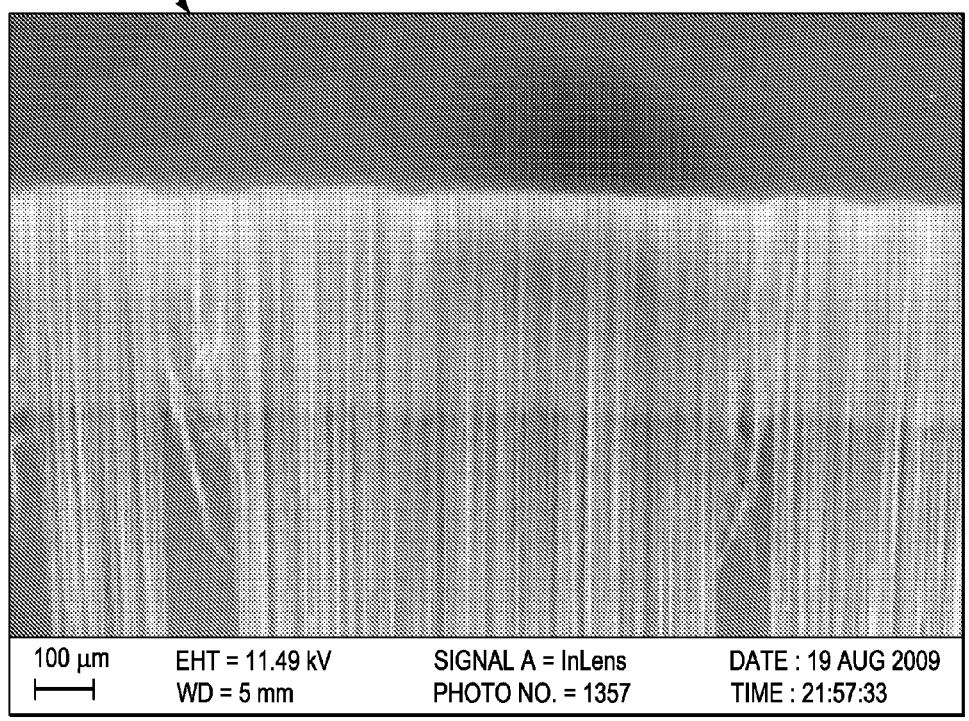
FIGS. 9C and 9D are SEM images of spun nanotubes and layered nanotube sheets.
Figure 9D:
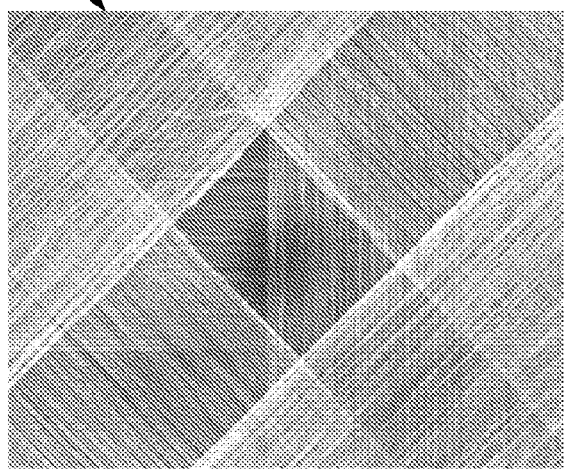

Optical microscope images of the as-drawn sheets show more homogeneity, clarity, and interconnects in the induction sample 920 than in a conventional sample 910, as FIGS. 9A and 9B show. This improves sheet property by increasing electron pathways for conduction and homogeneity improving the transparency of the sample 920, as FIGS. 9C and 9D show.

Electrical measurements show that the induction drawn sheets are two to three times greater in conductivity for the same height compared to previous samples. Conventional CVD methods with these reactants could only produce forests 900 μm tall, the induction can make forests 1,500 μm tall.

While the making and using of various embodiments are discussed in detail below, it should be appreciated that the present invention encompasses many novel and useful concepts that can be embodied in a wide variety of specific contexts. The specific embodiments discussed herein are merely illustrative of specific ways to make and use the invention and do not limit the scope of the invention in any way.

Various embodiments allow, due to separate inductive fast heating by advanced CVD synthesis, oriented arrays of aligned multiwalled carbon nanotubes which can be made dry-spinnable by a known self-assembly process that converts vertical forests into horizontal sheets and twist yarns.

Thus, the various apparatus and method embodiment for growing CVD forests provide highly spinnable CVD vertical forests of heights that are taller than known in the state of-art CVD conventional techniques, due to separated processes and further allows nanotubes to be transformed into sheets, yarns and ribbons onto any material or substrate by the application of continuous methods of spinning, shown in FIG. 10. Spinning is not only simple, but is also highly effective. Furthermore, the various embodiments allow the making of more dense and precise patterns or creating new patterns (different from original pattern on the substrates). Since the tubes only stick on the surface that has a layer of conducting material, the method and apparatus can be used to make clean patterns on the anode.

Various embodiments described herein can be used to produce inexpensive arrays by depositing aligned carbon nanotubes onto patterned substrate with gates. These embodiments alleviate or outright solve the serious technological problem of growing CNT in semiconducting devices. In addition, certain of these embodiments may be employed to produce patterned aligned carbon nanotube arrays.

Patterned multi-walled carbon nanotube samples can be grown on a doped silicon substrate. The array of oriented carbon nanotubes can form one or more patterns on the first surface. For example, the pattern can be formed by two or more arrays of oriented carbon nanotubes having a spacing of between 25 microns and 250 microns. The pattern may include one or more addressable targets. The pattern on the first surface is substantially duplicated on the second surface after the carbon nanotubes are sublimed from the first surface and re-deposited on the second surface. The pattern can be substantially duplicated without using a mask or a pre-patterned substrate.

The improved qualities of the nanotube forests made by techniques taught herein give better properties of the drawn nanotube sheets. For example, the following characteristics can be achieved: (1) the thermal conductivity can increase from 10 W/mK to 200 W/mK, which is close to the thermal conductivity of metals (KCu=398 W/mK); and (2) electrical conductivity can increase from 10 S/cm to at least about 100 S/cm. The resulting nanotubes can be used, for example, in displays, atomic/ionic microscopes and lasers.

Figure 14:
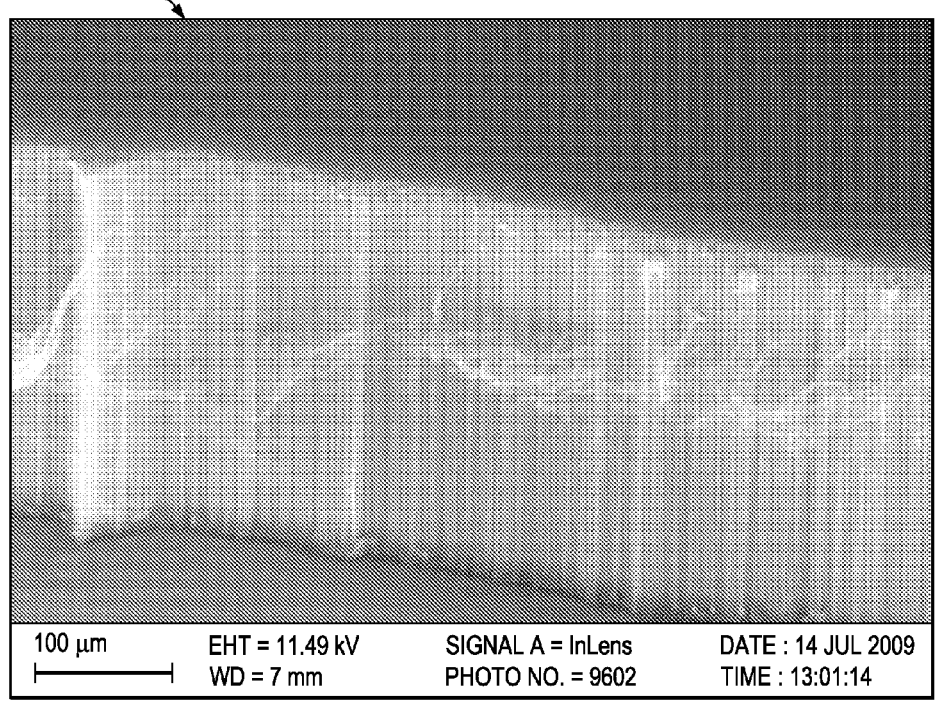
FIG. 14 shows an SEM image of a nanotube vertical array.

FIG. 14 shows a SEM image of a vertically aligned multi-walled carbon nanotube sample 1410 produced in accordance with the teachings herein. These carbon nanotubes typically have a length between 20 and 4000 microns, but may have lengths of between 50 and 200 microns. These carbon nanotubes also typically have a diameter between five and 30 nanometers, but may have diameters of between 10 and 20 nanometers. These carbon nanotubes further typically have a wall thickness between two and 20 nanometers, but other thicknesses may be achieved.

The improved qualities of the nanotube forests made by these techniques also give better thermal and electrical conductivity of the drawn nanotube sheets. These carbon nanotubes may have a thermal conductivity greater than 10 W/mK, e.g., between 100 W/mK and 300 W/mK. Similarly, the carbon nanotubes may have an electrical conductivity greater than 300 S/cm.

Figure 15A:
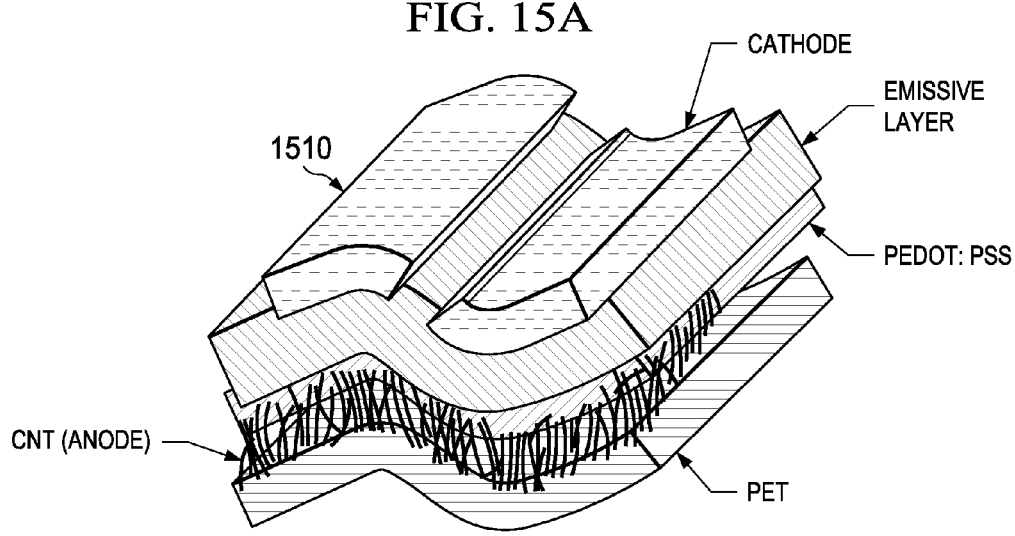
FIGS. 15A and 15B show one embodiment of an OLED using a CNT layer.
Figure 15B:
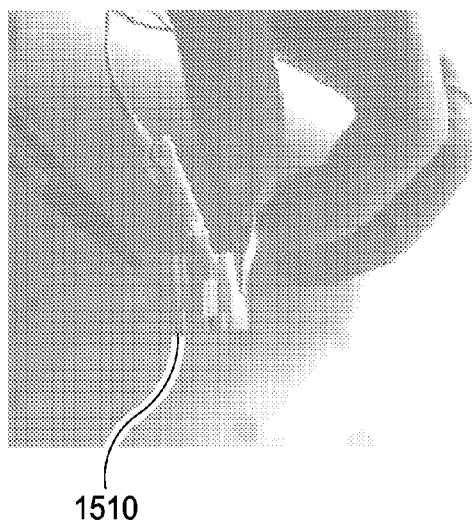
Figure 24:
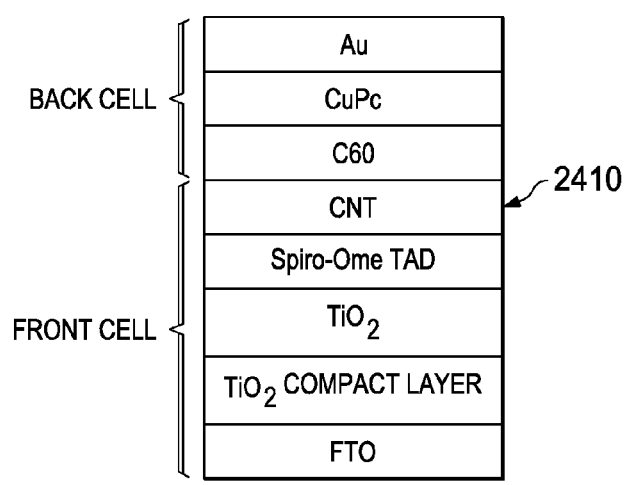
FIG. 24 shows a dye-sensitized (DSC)-Molecular Organic Photovoltaic (OPV) tandem solar cell.

FIGS. 15A, 15B and 24 are diagrams of devices 1510, 2410 on which the MWCNT sample (cathode) and the anode may be used for an organic photovoltaic device (an OPV), in which MWCNT transparent sheet is used as a bottom electrode. The MWCNT sheets can also be used as the top cathode electrode. The nanotubes are deposited on the second surface accompanied by field emission.

Accordingly, various embodiments provide an array of oriented carbon nanotubes on a substrate made in accordance with the method described above. Likewise, with the teachings herein, an array of oriented carbon nanotubes may be disposed on a metallic substrate having a relatively low melting point or that is relatively reactive with acetylene. Certain embodiments taught herein also provide an array of oriented carbon nanotubes disposed on a substrate, having a resistance on the order of three to four Ohms, an electrical conductivity greater than 100 S/cm, and a thermal conductivity greater than 100 W/mK.

Figure 25A:
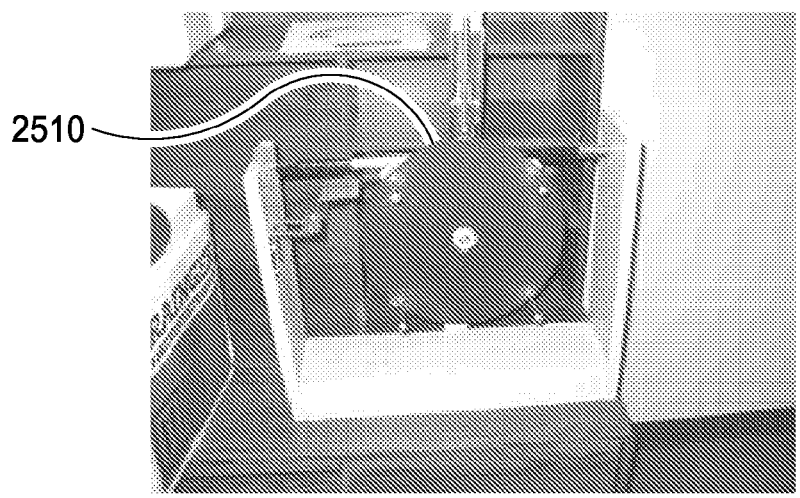
FIGS. 25A and 25B show photographs of one embodiment of a continuous spinning device.
Figure 25B:
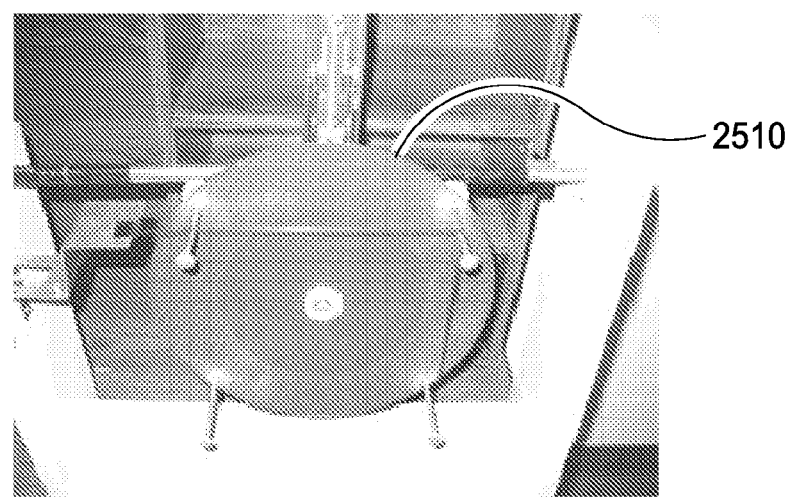

FIGS. 25A and 25B show photographs of a continuous spinning apparatus 2510 to transfer multi-walled carbon nanotubes to any type of substrate. The nanotube sheets additionally can be spun onto flexible plastic laminated film for use in many industrial applications. The method may include providing a third surface such that the second surface is disposed between the first surface and the third surface and wherein the second surface is porous such that the array of oriented carbon nanotubes are CVD grown and dry self-assembled from the first surface, pass substantially through openings within the second surface and are re-deposited on the third surface.

The first surface and the second surface for CVD separated growth can be oriented vertically, substantially planar, non-planar, and substantially perpendicular to one another, not perpendicular to one another, or any desirable configuration. The first surface and the second surface are typically separated by a distance of between 10 and 500 microns. The separation between the first surface and the second surface can be adjusted to fit the application. In addition, the surfaces are not limited to planar surfaces, e.g., the first surface is a cylinder and the second surface is a target disposed within the cylinder.

Figure 26:
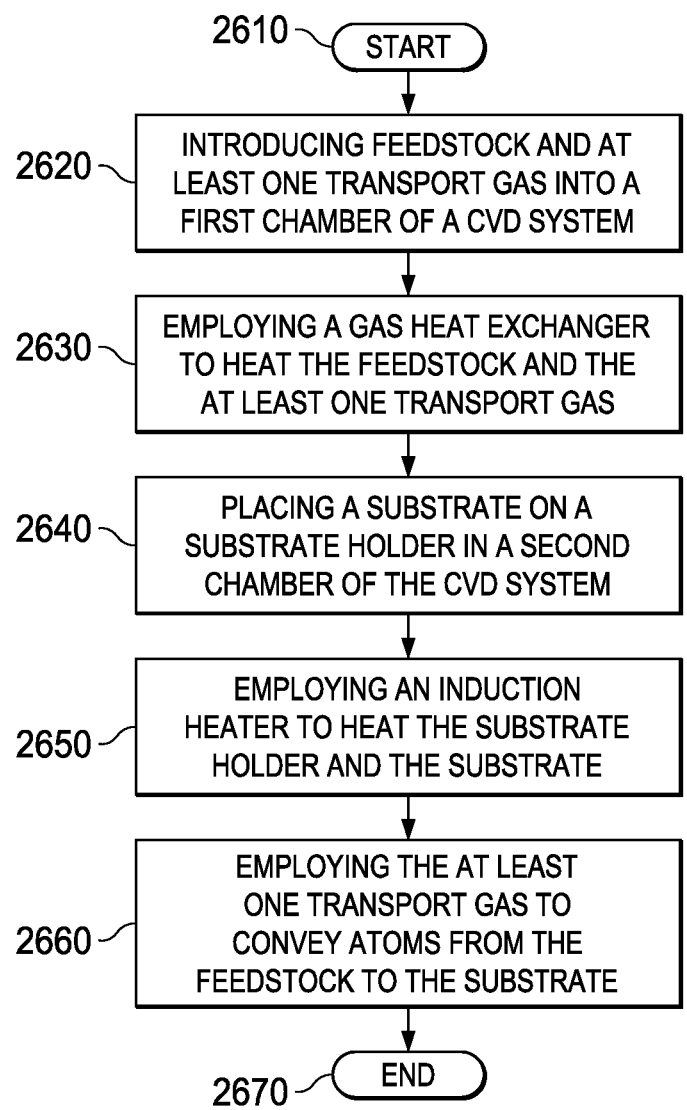
FIG. 26 shows a flow diagram of one embodiment of a method of substrate and gas heating during CVD nanotube synthesis.

FIG. 26 shows a flow diagram of one embodiment of a method of substrate and gas heating during CVD nanotube synthesis. The method begins in a start step 2610. In a step 2620, feedstock and at least one transport gas are introduced into a first chamber of a CVD system. In a step 2630, a gas heat exchanger is employed to heat the feedstock and the at least one transport gas. In a step 2640, a substrate is placed on a substrate holder in a second chamber of the CVD system. In a step 2650, an induction heater is employed to heat the substrate holder and the substrate. In a step 2660, the at least one transport gas is employed to convey atoms from the feedstock to the substrate. The method ends in an end step 2670.

Following are examples of various embodiments of the methods and apparatus described herein.

Embodiment 1

Figure 5:
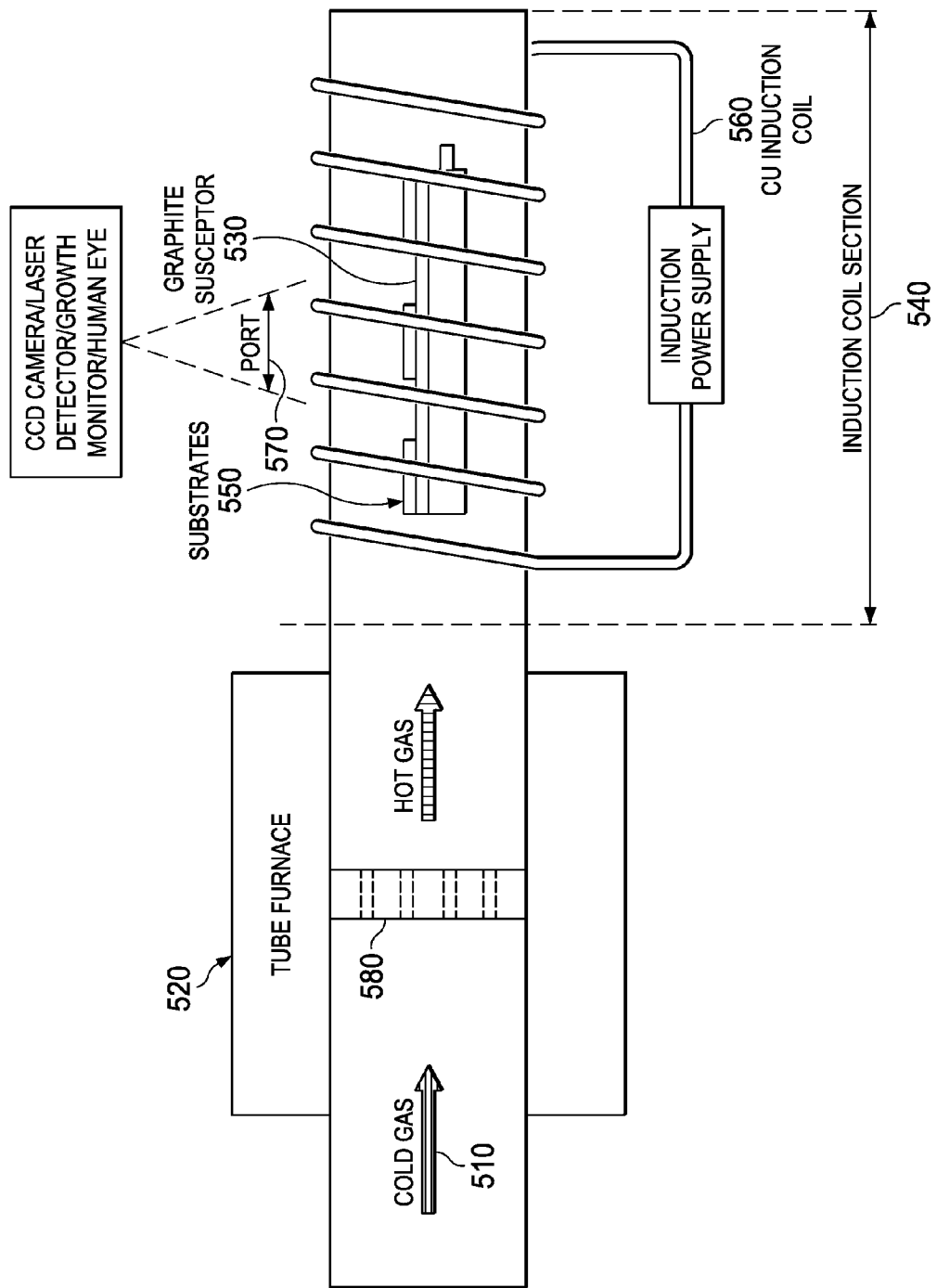
FIG. 5 is the schematic of one embodiment of an induction heating system.

In Embodiment 1, a cold wall induction system is employed to heat up substrates while a resistive heating tube furnace separately heats incoming gasses. FIG. 5 shows incoming gasses 510 heated by a tube furnace 520, exiting a furnace zone, and entering an induction coil section 540 where substrates 550 for nanotube growth are heated by an induction coil 560. This method and apparatus gives fine control over heating the gasses and substrate separately.

The temperature of the gasses is controlled by adjusting the set temperature of the tube furnace 520. Gas temperature exiting the furnace 520 is measured to determine the proper setting for the furnace 520. The size of the furnace 520 is not important as long as the gas temperature is at the correct level. This gives flexibility to the growth process where any furnace can be used for this purpose. The method to heat the incoming gas can also be varied.

Once the gasses are heated they enter the induction section 540 of the CVD process. The induction coil 560 heats up the graphite susceptor 530 which in turn heats up the substrates 550 on top of the graphite susceptoer 530. This quickly heats the substrates 550 to the desired operation temperature. The incoming gasses 510 that were pre-heated by the tube furnace 520 are now hot enough to properly dissociate on the growth substrates.

Embodiment 2

In Embodiment 2, the cold wall induction system is employed to heat up substrates while a resistive heating tube furnace 520 with a graphite heat exchanger 580 separately heats the incoming gasses 510. FIG. 5 shows the incoming gasses 510 heated by the tube furnace 520 and a graphite heat exchanger 580, exiting the furnace 520 and entering the induction coil section 540 where the substrates 550 for nanotube growth are heated by the induction coil 560.

Embodiment 2 is similar to Embodiment 1 except that the graphite heat exchanger 580 is within the gas pre-heat furnace 520. The heat exchanger 580 is a cylindrical disk about 3" in diameter, 2" in length, and has about 20 holes evenly drilled throughout the disk. The exact dimensions of the disk are unimportant as the primary purpose is to heat in the incoming gasses 510 more efficiently than an empty tube. This more efficient heating of gasses 510 means the tube furnace can be shorter and use less power to heat the gasses 510 to the proper temperature.

Embodiment 3

In Embodiment 3, the cold wall induction system is employed to heat up the substrates while a second induction system and heat exchanger separately heats the incoming gasses using. Embodiment 3 is similar to Embodiment 1 except that the gas pre-heat furnace is another induction using a graphite heat exchanger to properly heat the incoming gasses. This allows for the ability to quickly change the gas temperature based on the needs of the experiment. When using a resistive heating furnace it takes a lot of time to heat up or cool down the large mass of the oven. When using the induction/heat exchanger combination this temperature change may be extremely fast, so settings can be changed real-time to adjust the product properties.

This ability to change temperature quickly also allows for quick batch production of spinnable nanotube forests. If needed the system can be cooled down to room temperature in a few minutes, components changed out, and heated back up again in a few minutes. Just like Embodiment 1 the gas pre-heat coil can be left on and the samples changed out without having to cool down the whole apparatus, since they are down stream of the pre-heat coil.

Embodiment 4

In Embodiment 4, an induction coil is employed to heat substrates to a higher temperature than would be conventionally employed (e.g., >750° C.) to result in an increased nanotube forest growth rate. The longer time needed for a conventional resistive furnace to reach temperatures higher than 750° C. means that the nanotube substrates experience increased Ostwald ripening, diminishing the quality and spinnability of the nanotube forest. Quickly heating the substrate keeps the catalyst active much longer so taller forests can be grown with this method.

The limit to the ultimate temperature and speed is only limited by the power of the induction power supply. With enough power the samples can reach over 1,200° C. in just minutes compared to 60 minutes for a conventional tube furnace. Even if the higher temperature is not desired, a high power supply can get samples to temperature in less than a minute.

Embodiment 5

In Embodiment 5, a thermally conductive coating is employed on the inner surface of the flow tube to enhance gas heating and reduction of incoming IR radiation. FIG. 2 shows how the incoming gasses are more efficiently heated by a thermally conductive coating 220 on the inner surface of the tube 230. Thermal energy from resistive coils (not shown) hits the coating 220 causing the coating 220 to heat up much faster than the quartz, which constitutes the tube 230. The coating then transfers this energy to the gasses about 100 times more efficiently than quartz alone.

In addition to heating the gasses properly, a dark coating 220 attenuates the incoming IR radiation from the coils. Too much of this radiation can damage the catalyst by uneven heating of the surface.

Embodiment 6

Figure 3:
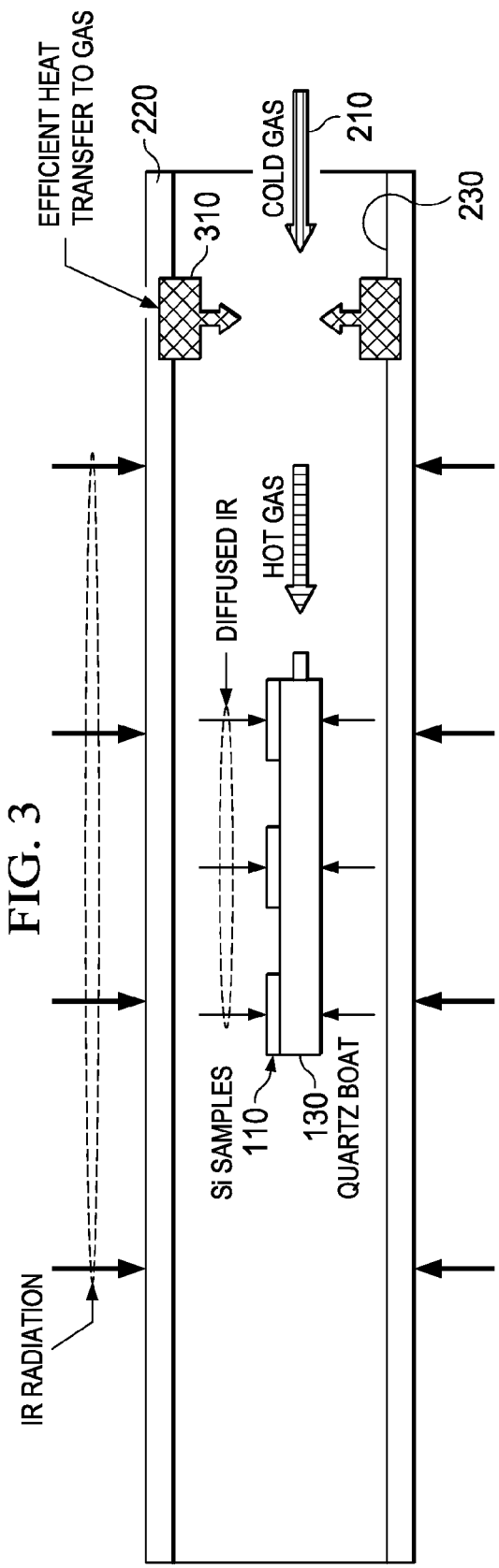
FIG. 3 is the schematic of one embodiment of gas heating using a graphite heat exchanger.

In Embodiment 6, a tube furnace is employed to heat the gasses and substrate with the addition of a graphite heat sink to heat the incoming gasses. FIG. 3 shows the conventional CVD process using just a single furnace to heat the gasses and substrate. This example adds a graphite heat sink 310 upstream to the samples. This way the incoming gasses are heated efficiently by the heat sink 310. Using a three-zone furnace allows the user to adjust the temperature of the zone containing the heat sink, but this control is more limited than separate heating methods for the substrate and gasses.

The size of the graphite heat exchanger 310 can be adjusted based on the desired gas temperature. A longer heat exchanger 310 increases the residence time within the heat exchanger 310, further increasing the temperature of the gasses. The size and number of holes in the heat exchanger 310 can also be adjusted to increase/decrease surface area with which the gasses come in contact. A large amount of smaller holes in the heat exchanger 310 increases its overall heating efficiency.

Embodiment 7

Figure 4:
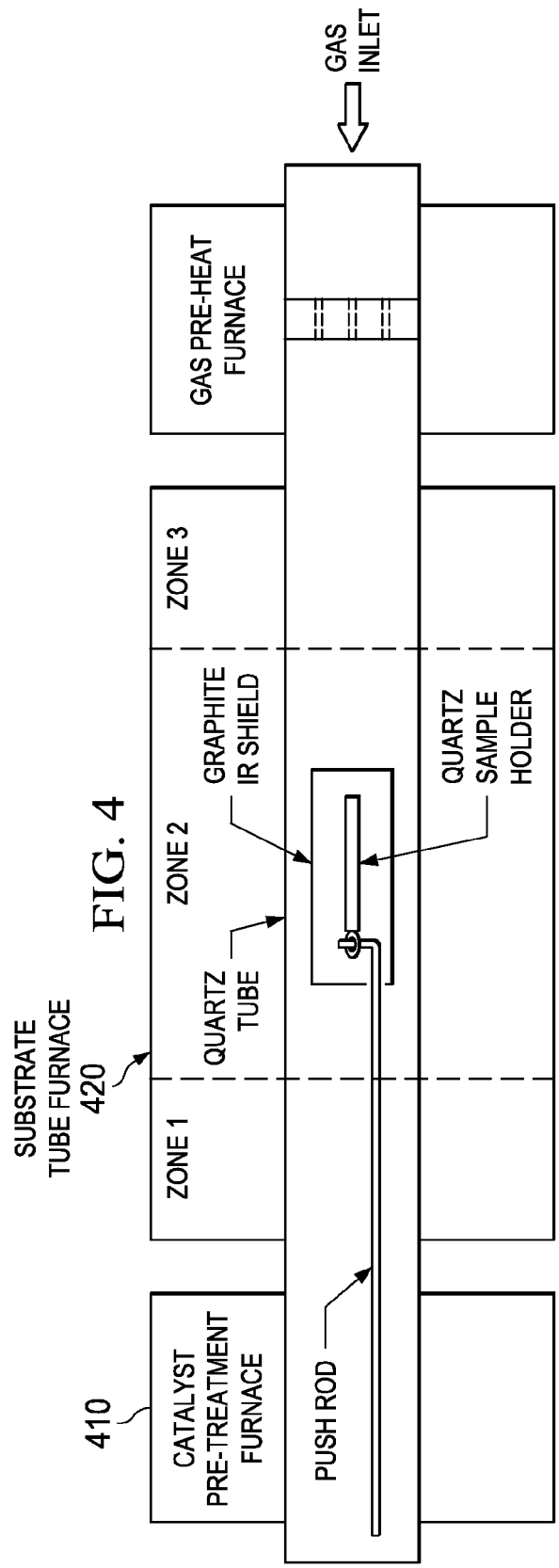
FIG. 4 is the schematic of one embodiment heating using separate heating chambers.

In Embodiment 7, a third heating system is employed to pre-treat the sample catalysts for proper nanotube growth. FIG. 4 shows how the substrate can be moved into a catalyst pre-heat furnace 410, and then moved into a growth zone 420. The pre-heat furnace 410 can be any type of heat source, but using an induction system allows for quick heating and treatment of samples.

The pre-heat furnace 410 also allows for independent control over the catalyst formation. This can include pre-heating the catalyst to a much higher temperature than the growth temperature. This way the catalyst is prepared for growth by this higher temperature that could not be achieved by placing the sample directly into the main growth zone.

Embodiment 8

In Embodiment 8, an open, cold walled induction heater is employed to allow for in-situ diagnostic and quality control of nanotube growth. FIG. 5 shows how the induction coil system allows for the ability to see the samples during growth through the quartz tube. Using a "port" 570 gives the user the ability to perform in-situ diagnostics on the system. These diagnostics can show the growth rate, growth properties, nanotube quality, height, surface quality or other properties during growth, so settings can be changed real-time to compensate for any anomalies.

The port 570 also allows for quality control of the product since the user can see real-time if any problems arise. If needed, a run can be aborted, saving time and money.

Embodiment 9

Figure 6:
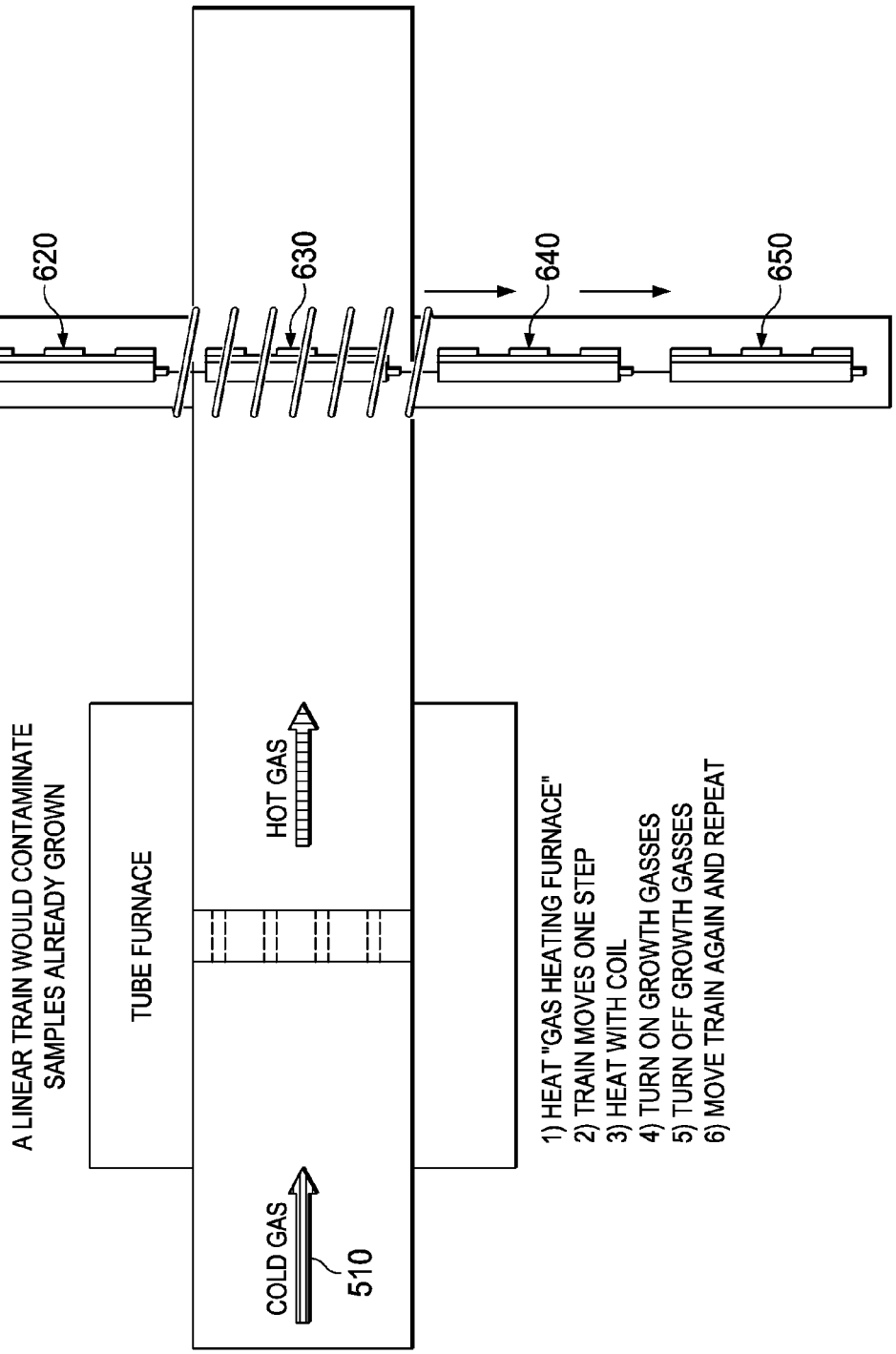
FIG. 6 is the schematic of one embodiment of an induction heating system train design.

In Embodiment 9, a "train" system 610 of substrate holders is employed to allow the continual production of nanotube substrates without the need to cool down the chamber. FIG. 6 shows the general design of this system. With Embodiment 9 the user can move from sample 620 to sample 630 to sample 640 to sample 650, and so on, without the need to cool down the gas pre-heat or substrate heating systems. This allows the user to perform multiple parametric studies without the need to reset the system for multiple runs. For example, the sample 620 can have a growth temperature 20° higher than normal; the sample 630 can have different concentration of acetylene; and the sample 640 can employ a completely different substrate material.

The train 610 can even run in a continuous circle with an antechamber at the end where samples can be placed into quartz boats real-time. This way the system can run continuously without the need to shut it down.

Embodiment 10

Figure 7:
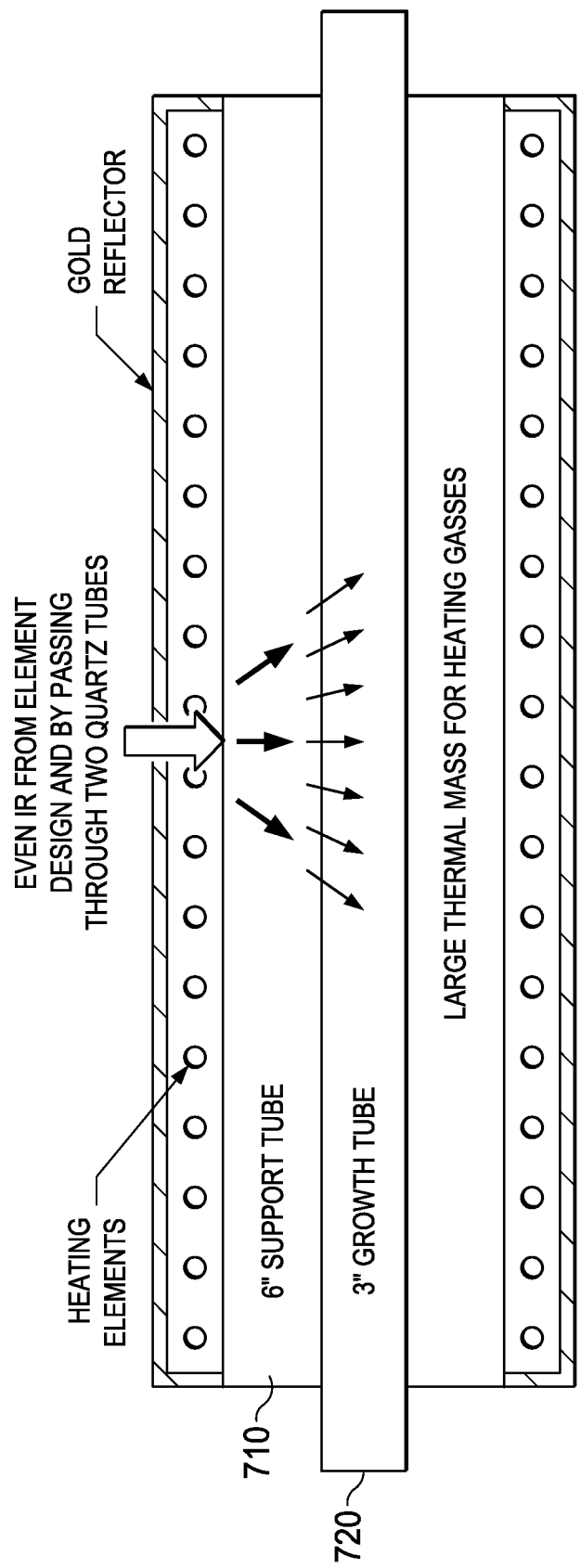
FIG. 7 is a schematic of one embodiment of a 6" furnace system.

In Embodiment 10, a larger multi-walled furnace is employed to induce more heat into the system allowing for improved nanotube growth. FIG. 7 shows this system to heat the substrate and gasses. The large mass of the furnace which includes two tubes, a larger outer tube 710 and a smaller inner tube 720, imparts more energy into the incoming gasses. This properly heats the incoming gasses to the right dissociation temperature. The size of the furnace and double quartz tubes also evenly distributes the IR radiation so the concentrated IR damage is not present, unlike a conventional 3" tube furnace.

The larger furnace also allows the insertion of a full sized 6" wafer. The wafers can be vertically or horizontally stacked in the larger tube 710 for growth on the entire wafer to minimize losses through wafer scribing and allows for wider pulled sheets.

Embodiment 11

In Embodiment 11, a single resistive heated furnace with multiple zones is employed to grow of nanotubes. The gasses are pre-heated at a higher temperature than the substrate temperature to efficiently heat the incoming gasses. FIG. 1 shows a conventional CVD growth furnace in which three samples 110 are created. Only the temperature of the incoming gasses can be changed by changing the temperature of a single heat source 120. This imparts additional energy into the gasses so they reach a higher temperature before reaching the substrates.

Typically the samples 110 on the downstream side of the boat are much better due to the increased temperature of gasses by the time they reach the end of a boat 130 that holds them. Turning up the temperature of the heat source 120 diminishes this effect where the samples upstream are also high quality.

Embodiment 12

In Embodiment 12, an IR shield is employed to protect substrates from overheating by IR exposure. FIG. 2 shows the use of an IR attenuator 220 that is inserted into the growth chamber surrounding the substrates. This mimics the carbon coating 220 mentioned in Embodiment 5 without the need to coat the entire tube surface. This may be used with a graphite heat exchanger (e.g., 310 of FIG. 3) so the gasses are properly heated, since the coating is not present.

The shield needs to attenuate the IR, not completely block it. The IR is still needed to heat the substrates so the attenuator is used to diffuse the IR to prevent hot spots. This can include smoky quartz or a pre coated quartz insert.

Embodiment 13

In Embodiment 13, the gas pre-heating temperature is controlled by changing the total flow rate of growth gasses. The gasses used for nanotube growth are injected into the furnace at a specific flow rate depending on the run conditions. Varying this flow rate changes the residence time of the gasses within the hot zone before they reach the substrates. This residence time affects the temperature that the gasses reach before they flow over the samples. To increase the gas temperature the total flow rate can be lowered, and to decrease the temperature the flow rate can be increased.

If the temperature needs to be constant then the temperature of the furnace needs to be changed if the gas flow rate is changed. This keeps the runs consistent if this is desired.

Embodiment 14

In Embodiment 14, helium is employed as the inert buffer gas, instead of argon or other inert gasses. The most common inert buffer gas used for this process is argon. Argon has a thermal conductivity of 0.017 W/mK while helium has a thermal conductivity of 0.15 W/mK. Helium has a thermal conductivity 10 times that of argon. This further improves the overall heat transfer in the system. The gasses and substrates are more efficiently heated by this increased thermal conductivity.

In addition to helium's high thermal conductivity hydrogen has a thermal conductivity of 0.18 W/mK. Since it also has a high conductivity, increased percentages of hydrogen would also be thermally beneficial. Embodiment 17 elaborates further on the role of hydrogen during nanotube growth.

Embodiment 15

In Embodiment 15, a thermal platform is employed on which samples sit. In a conventional CVD furnace the samples sit directly on a quartz platform. Since quartz has a relatively poor thermal conductivity, the heat transfer to the sample via conduction is relatively low. Samples can be placed on a graphite block which in turn sits on the quartz platform. This way the samples are more efficiently heated by the hot graphite. This graphite block is conventional for induction heated samples as seen in FIG. 5, but this can be used in conventional CVD runs to further enhance heating of the substrates.

In addition to increasing thermal conduction the graphite block provides a relatively even source of heating to minimize natural hot/cold spots that form. The graphite mass thermally evens out heating on the substrates that the quartz would not otherwise provide.

Embodiment 16

Figure 11:
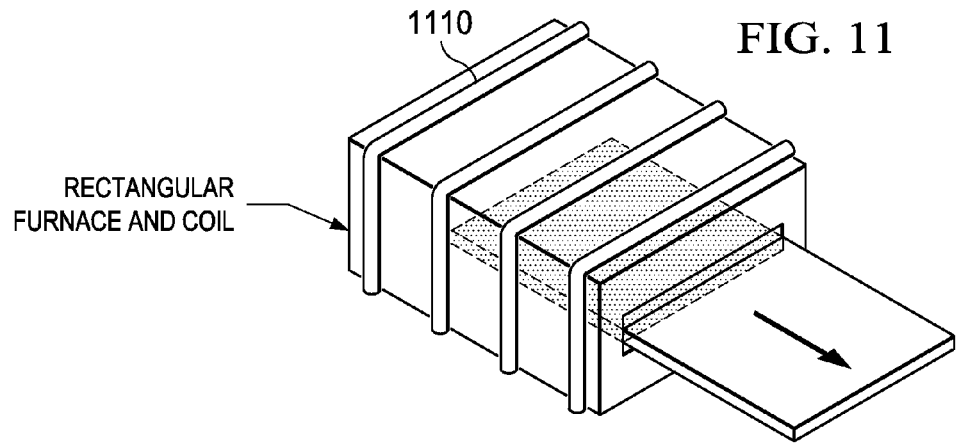
FIG. 11 shows one embodiment of a rectangular furnace and coil for continuous drawing of sheets.
Figure 12:
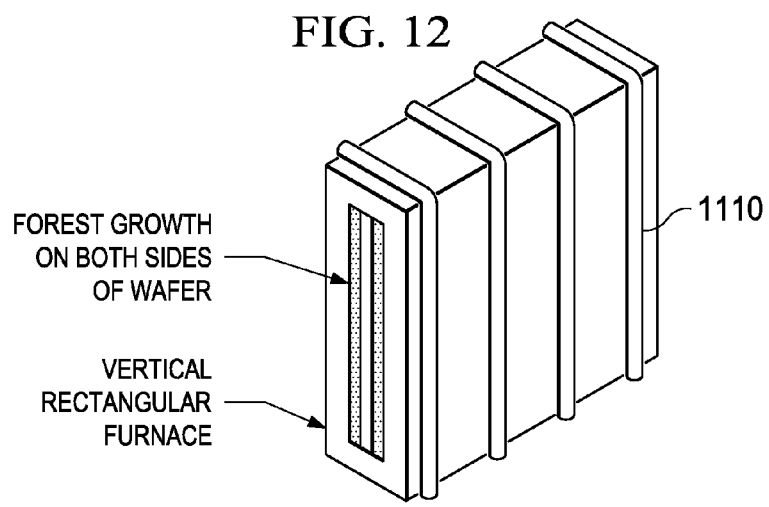
FIG. 12 shows one embodiment of a vertical rectangular furnace and coil.
Figure 13:
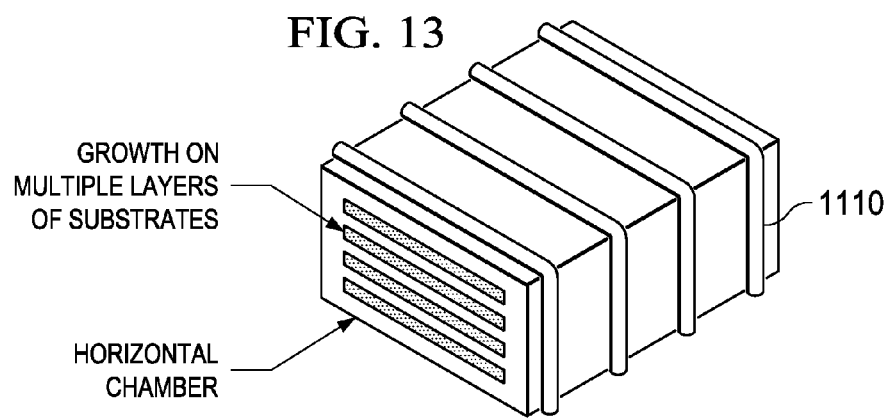
FIG. 13 shows one embodiment of a horizontal induction chamber growth with plural stacks of growth substrates.

In Embodiment 16, the induction heating zone is expanded, allowing the use of furnaces with different size and profile, in contrast to the cylindrical quartz tubes that conventional CVD techniques employ. Induction systems often employ a water-cooled copper coil that is used to induce current into samples. This coil geometry can be changed as needed. For example, the coil can be longer or larger in diameter. The coil can even be rectangular for growth on large substrates as a coil 1110 in FIGS. 11 through 13 illustrates. A coil with the new dimensions is simply created and connected to the induction power supply.

Embodiment 17

In Embodiment 17, hydrogen gas is employed to burn away amorphous carbon from the catalyst clusters. The increased temperatures of the gasses and induction system means that amorphous carbon can build up faster on the nanotube catalyst causing a pre-mature quenching of growth. Conventional systems employ hydrogen to burn away this coating, but this percentage of hydrogen can be increased to compensate for the increased coating rate.

This balance between hydrogen, inert gas, and growth gas can be varied to find the optimal levels. The percentage of hydrogen could be dependent on the growth temperature. The hydrogen levels can be increased to a level that removes amorphous carbon but not so high to quench growth.

Embodiment 18

In Embodiment 18, relatively small diameter nanotubes are synthesized using thinner catalyst layers and an increased growth temperature. In general, the growth of carbon nanotubes at higher temperatures leads to smaller nanotubes with thinner walls. With the heating techniques described herein, nanotubes can be grown at higher temperatures, thus decreasing the thickness of walls in the tubes.

Lower wall thickness can also be achieved by using a thinner catalyst layer. A typical thickness of iron is 3 nm but can be lowered to 0.5 nm. This catalyst layer can be properly prepared by a heat treatment described in Embodiment 7. The higher temperature can be used to pre-treat the thinner catalyst layer properly.

Embodiment 19

In Embodiment 19, an aluminum oxide buffer layer is employed between the silicon substrate and the iron coating. To achieve good nanotube growth an oxide buffer layer can be used to provide a "scaffold" for good catalyst formation. To properly create this catalyst formation the substrate would benefit from the same pre-heat oven shown in Embodiment 7. This higher pre-heat temperature properly forms the catalyst clusters that can't be achieved by a conventional CVD system with no independent control of the temperatures.

Embodiment 20

Embodiment 20 illustrates the power benefit to using the induction system described herein. A normal CVD system needs a large, three-zone furnace that is powered on the entire length of the run. Using the induction system means the user can use a much smaller pre-heat furnace for the gasses and only turn on the induction system for the short heat up period and the growth run time.

Embodiment 21

In Embodiment 21, microwave pulsing is employed to control the growth of carbon nanotube forests. The quick variance of microwave power can change the heating profile of the substrate. The change with respect to time can alter real-time how the nanotubes grow in the array. This can change the morphology of the forests as to create a periodic effect on the nanotube quality and type. Microwave frequency, pulse duration, and pulse form can all be changed to measure the effects on nanotube growth.

Embodiment 22

In Embodiment 22, inlet gas pulsing is employed to control the growth of nanotube forests. The quick variance of gas speed can change the growth profile of the forest. The change with respect to time can alter real-time how the nanotubes grow in the array. This can change the morphology of the forests as to create a periodic effect on the nanotube quality and type.

Embodiment 23

In Embodiment 23 carbon materials other than nanotubes (including but not limited to graphene) are grown using the various embodiments of the methods and apparatus described herein. Graphene can be grown on nickel or copper substrates for various applications. The pre-heating and induction system improves upon this growth allowing for more complete growth, higher volume grown, higher quality, and the ability to achieve higher temperatures.

Embodiment 24

In Embodiment 24, water vapor is employed during nanotube growth. Using water vapor during growth with the induction system creates better forest growth by removing carbonaceous growth on the catalyst clusters keeping the nanotubes active for a longer period of time.

Achieving by Inductive CVD a Structure of CNT Forest that is Readily Spinable

Figure 27:
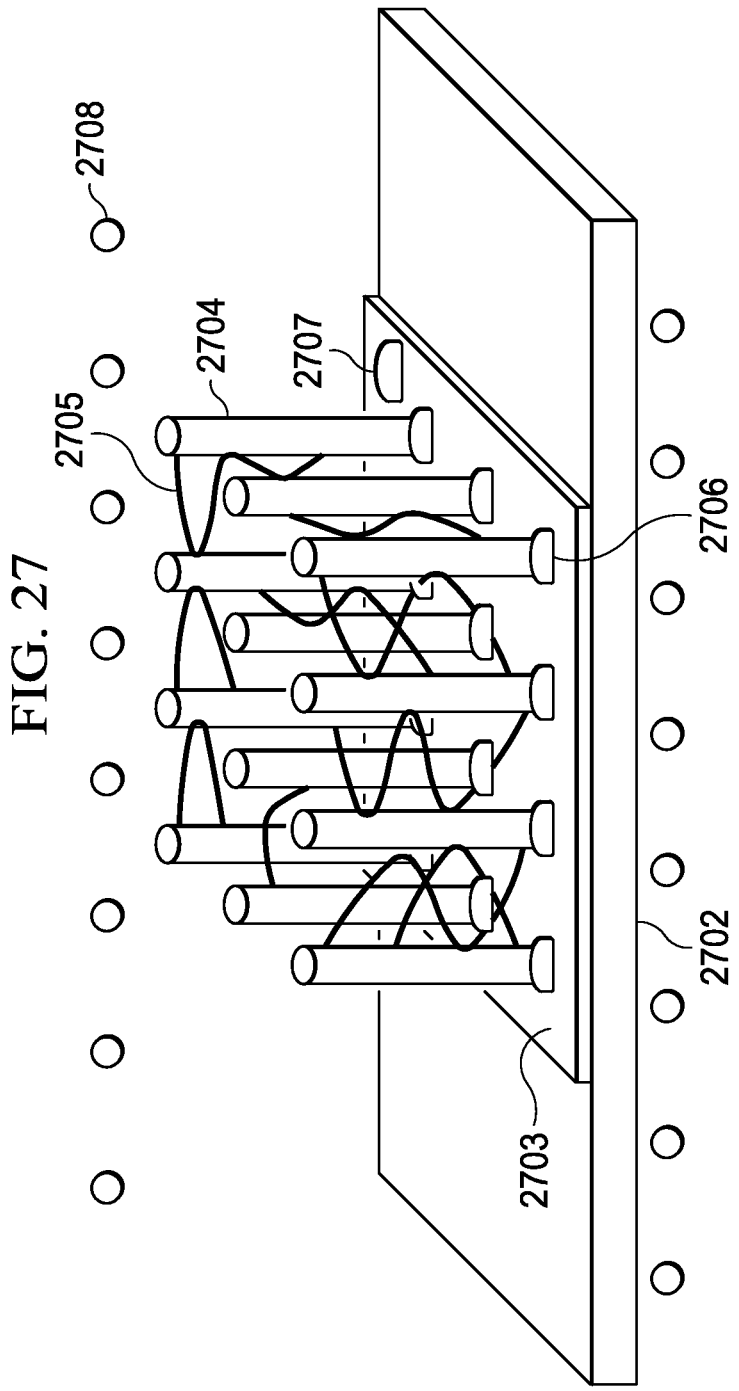
FIG. 27 shows a diagram of nanotube forest growth in an induction system.

Nanotube growth with gas pre-heat inside an induction furnace has many advantages over current CVD technologies for achieving spinability. FIG. 27 shows a diagram of nanotube forest growth in the induction system, which includes an induction coil 2708 shown in cross-section. An iron, silicon or similar catalyst coated substrate 2703 sits on a graphite susceptor 2702 that absorbs RF energy and through conductive heat transfer increases the substrate temperature to the optimal growth level. In the illustrated embodiment, the graphite susceptor 2702 has a width of about two inches and a height of about 0.5 inches. During a heating phase the catalyst clusters are formed from an initial e-beam deposited thin film into various sizes (including a small catalyst particles 2706 and large catalyst particles 2707) and nanotubes starts growing from the catalyst nanoclusters and eventually combine into CNT bundles 2704 by VanderWaals forces. As the nanotube bundles 2704 grow, additional smaller size nanotubes bridge the gaps between bundles 2704, creating bundle-to-bundle nanotube interconnects 2705. Namely these interconnects 2705 provide connections needed for good spinnability. The optimized heating of the gas and substrates also means the nanotubes can grow very tall due to the increased activity of the catalyst particles by minimizing Ostwald ripening (a process which coalesces smaller nanoclusters into bigger ones by atomic diffusion on the surface). The inductive CVD system gives the ability to fine tune the following properties; forest height, forest density, bundle size, interconnect density, catalyst particle size, tube diameter and number of walls in a single MWCNT.

Forest height is improved by the fast heating of the induction and pre-heating of the gasses. By heating the substrate in two minutes the catalyst particles are quickly activated and the Ostwald ripening minimized. Once growth starts the pre-heated gasses more efficiently dissociate on the catalyst particles so the growth rate and hence the total height of the forest is improved significantly. Tubes can be grown at least twice as fast using this method, as compared to standard CVD. Forest heights of over 1 mm can be achieved in less than 10 minutes while in a standard CVD can take 20 minutes or more.

Forest density is also improved by the fast heating of the induction and pre-heating of the gasses. Fast heating of the substrate activates more of the catalyst particles while gas pre-heating means more of the catalyst particles nucleate nanotubes. In a standard CVD system many of the catalyst particles are formed, but they do not nucleate tubes due to inefficient dissociation of the gasses or large size of nanoclusters. The higher ratio of catalyst particles that grow tubes means the forest density is significantly improved. This higher density leads to improved spinnability and better sheet properties such as higher thermal conductivity, electrical conductivity, optical transparency, and strength. The density can also be tuned based on the need of the current application. Pre-heat temperature can be lowered if a less dense forest is needed. This fine tuning can be used for projects where low density is preferable such as hydrogen absorption or solar energy capture.

Bundle size (i.e., the number of tunes in a bundle, typically ranging from 20 to 50, but sometimes larger) is improved by the fast heating and pre-heat of gasses. The size of bundles can affect the spun sheet properties. This includes sheet thermal conductivity, electrical conductivity, strength and transparency. Thermal conductivity, electrical conductivity and strength can all be enhanced by increasing the bundle size of nanotubes. The increased bundling means more nanotubes are in direct contact with each other. This contact increases mechanical strength by having more VanderWaals interaction between the tubes, thermal conductivity is enhanced by increased surface area contact, and electrical conductivity is increased by having more interconnects between tubes in the spun sheet. In contrast, lowering the bundle size improves the optical transparency of the spun sheets. Less bundling means more air space between the neighboring tubes, leading to more light transmitted through the sheet.

Interconnect density is improved by the fast heating and pre-heat of gasses. Interconnects are formed when single unbundled nanotubes weave between bundles of nanotubes. When the forest is spun, the interconnects hold the adjacent bundles together during their pilling off from the forest (when a forest is converted into a sheet) so they spin properly into a planar sheet. These interconnects are probably formed by smaller catalyst particles between the primary catalyst particles that grow into the bundles. These smaller catalyst particles are easy to quench due to the secondary nature of the particles and improper reaction of the gasses on the surface. The fast heating and gas pre-heat activates these particles and keeps them reactive long enough to grow these interconnects. This density can also be fine tuned for the particular application at hand. Lowering the pre-heat decreases the interconnect density if only larger bundles are desired.

Catalyst particle size distribution is also improved by the fast heating of the induction system. If the substrate is heated slowly, the particles are not properly formed and allow more time for Ostwald ripening. The quick heating forms the particles more efficiently and activates them for growth. The heating range of the induction and separate heating of the substrate also means that the catalyst surface can be pre-treated at a much higher temperature than the standard growth temperature. This higher temperature pre-treat is advantages to forming smaller catalyst clusters so the tubes diameter can be lowered. This gives the ability to fine tune the number of walls and tube size of each separate multiwall tube for a particular application.

The control over the catalyst particle size leads to the ability to tune the nanotube size and number of walls. Catalyst particle size and distribution leads to the ultimate diameter and number of walls of the nanotube forest. The catalyst particle size needs to be small for good growth of bundles with spinnability. The process maximizes small particles while minimizing larger particles that will destroy good growth and bundling, and also decrease the forest height. The fast heating preserves the catalyst particles keeping them from aggregating in to larger ones. With fine control over the catalyst particles stated above, the tube diameter and number of walls consequently can be tuned. For example, lower number of walls leads to improved electrical conductivity while higher number of walls improves the nanotubes ability to absorb microwave radiation. Smaller tube diameters also lead to sheets that are more optically transparent.

The fast heating also preserves the catalyst by preventing poisoning by amorphous carbon over coating. In a standard CVD system an amorphous carbon forms over the catalyst particle eventually deactivating its ability to grow nanotubes.

The fast heating keeps these particles (improved also in presence of hydrogen gas) active and minimizes this over coating.

The susceptor used in FIG. 27 improves the transfer of induction energy to the substrates. Nanotube substrates by themselves are not efficient at absorbing this RF energy. The small cross section and small mass means that the samples do not absorb enough energy to reach the target temperature. In this setup the highly conductive graphite susceptor absorbs this RF energy, and through conduction the substrates reach temperature. This minimizes energy losses since the graphite is efficient at converting radiation into thermal energy. The relatively large mass of the susceptor also means that the samples are more evenly heated. Use of a smaller susceptor, or just the samples alone, means the substrates would be unevenly heated, leading to problems with homogeneity in the catalyst and forest growth. Size and morphology of the susceptor can be changed based on the design and orientation of the coil. This can include circular, spherical and cylindrical type susceptors to properly heat one or an array of substrates. Another conductive material also can be used as a suspender, while a stainless steel substrate can be also used instead of silicon for better heat exchange with catalyst and growing forest.

Those skilled in the art to which this application relates will appreciate that other and further additions, deletions, substitutions and modifications may be made to the described embodiments.

What is claimed is:

1. A method for advanced separate heating of reaction and product components during CVD synthesis of carbon based nanostructures, comprising:
   introducing feedstock and at least one transport gas into a first horizontal chamber of a CVD system;
   employing a gas heat exchanger inside of said first horizontal chamber to heat said feedstock and said at least one transport gas;
   placing a substrate on a substrate holder in a second horizontal chamber of said CVD system;
   employing an RF induction heater to heat said substrate holder and said substrate; and
   employing said at least one transport gas to convey atoms from said feedstock to said substrate.

2. The method of claim 1 wherein said method makes arrays of vertically aligned nanotubes wherein said arrays are converted to a continuous sheet of horizontally aligned free standing nanotubes by a spinning process.

3. The method of claim 1 wherein said gas heat exchanger is a graphite heat exchanger.

4. The method of claim 1 wherein said heating of said substrate holder and said substrate occurs in two minutes or less.

* * * * *